US008033050B2

(12) United States Patent
Matlen

(10) Patent No.: US 8,033,050 B2
(45) Date of Patent: Oct. 11, 2011

(54) SELF-CONTAINED APPARATUSES FOR HANGING, HOLDING, ROTATING, OR WATERING PLANTS USING SOLAR POWER FOR PLANT MAINTENANCE

(76) Inventor: Darryl Matlen, Deer Park, WA (US)

( * ) Notice: Subject to any disclaimer, the term of this patent is extended or adjusted under 35 U.S.C. 154(b) by 213 days.

(21) Appl. No.: 12/217,032

(22) Filed: Jun. 30, 2008

(65) Prior Publication Data

US 2009/0320363 A1    Dec. 31, 2009

(51) Int. Cl.
*A47G 7/02*    (2006.01)
(52) U.S. Cl. .......................................... 47/67
(58) Field of Classification Search ............ 47/67, 79
See application file for complete search history.

(56) References Cited

U.S. PATENT DOCUMENTS

| | | | | |
|---|---|---|---|---|
| 2,206,191 | A | * | 7/1940 | Jaschke ........................... 222/42 |
| 2,639,061 | A | * | 5/1953 | Gladis ............................ 222/285 |
| 4,051,627 | A | | 10/1977 | Schilling, Jr. |
| 4,825,591 | A | | 5/1989 | Han |
| 4,848,029 | A | * | 7/1989 | Han ................................ 47/79 |
| 4,873,790 | A | | 10/1989 | Laterza |
| 5,152,099 | A | | 10/1992 | Nilssen |
| 5,546,698 | A | * | 8/1996 | Rock ............................... 47/67 |
| 5,862,628 | A | | 1/1999 | Takashima |
| 5,956,897 | A | | 9/1999 | Takashima |
| 6,161,329 | A | | 12/2000 | Spelt |
| 6,230,440 | B1 | | 5/2001 | Deutsch |
| 6,845,588 | B2 | | 1/2005 | Muxlow |
| 2005/0081441 | A1 | | 4/2005 | Mantovani |
| 2009/0320363 | A1 | * | 12/2009 | Matlen ........................... 47/65 |
| 2009/0320365 | A1 | * | 12/2009 | Matlen ........................... 47/66.6 |
| 2009/0320366 | A1 | * | 12/2009 | Matlen ........................... 47/66.6 |

FOREIGN PATENT DOCUMENTS

| | | | |
|---|---|---|---|
| CN | 201084939 Y | * | 7/2008 |
| GB | 2376401 A | * | 12/2002 |

* cited by examiner

*Primary Examiner* — Frank T Palo
(74) *Attorney, Agent, or Firm* — Malhotra Law Firm, PLLC; Deepak Malhotra

(57) ABSTRACT

Plant supporting apparatuses designed to hang a planter and plant at a variety of desired locations without lines for external electrical or water supply. Power is provided by solar cells. This construction allows the placement of plants almost anywhere and provides desired routine maintenance automatically. The apparatuses rotate the plant to grow uniformly even though incident light is non-uniform. There are two main assemblies which rotate relative to each other. A pump transfers liquids from a reservoir to a dispensing outlet onto a planter. The pump may be configured to move within the reservoir to stir the water, fertilizer or other liquids being fed to the planter. A planter is also shown which has solar cells and other parts mounted thereon. A control system is used to control operation and ambient light and reservoir liquid level are sensed.

42 Claims, 15 Drawing Sheets

SELF-CONTAINED APPARATUSES FOR HANGING, HOLDING, ROTATING, OR WATERING PLANTS USING SOLAR POWER FOR PLANT MAINTENANCE

TECHNICAL FIELD

The technical field of the inventions relate to apparatuses and methods for hanging planters and performing automatic plant maintenance.

BACKGROUND OF THE INVENTION

Plants that can be grown indoors are commonly sought after for their decorative appeal, aroma, herbs, spices produced thereby, and for other reasons. Many people enjoy keeping plants within their home or office for ambiance. However these plants typically require regular attention and if not properly cared for they become ill or even die. Similarly, there are a number of people who keep plants about a patio or doorway for decorative appeal and other reasons. These too may best be served by automatic plant maintenance.

Plants require regular watering and most need added fertilizer or other nutrients. Busy schedules, work, traveling, vacation absences, and simple neglect can cause all of these and prevent a plant from being properly maintained. Thus, many people return to a sick or dead plant.

Since plants can be expensive and involve time and trouble to buy, transport, and transplant into planters; people are often hesitant to simply replace or keep replacing sick or dead plants if the same outcome will most likely befall the new plant or plants. Therefore, many people conclude they are unable or unwilling to enjoy and maintain plants. This is especially true for many locations within a building where conditions are not optimal. Thus, the plant enthusiasts are limited in where they place planters in most situations and are prevented from using a much greater variety of planters, plants, and plant locations.

Below are some common indoor plant needs along with how they generally effect the plant if not properly maintained.

Light is vitally important to plant life. Light exposure is necessary for the plant to go through photosynthesis, a process through which the plant uses the energy from incident light to produce sugars. The plant uses these sugars to sustain itself and grow.

Water is also necessary for plants, particularly the photosynthesis process, as well as many other functions the plant undergoes. Other constituents, such as a number of elements or other nutrients containing them are important for good plant living situations. Examples include elements such as nitrogen, phosphorus, sulfur and potassium are in many instances important to plant functions. Depending upon the plant, it may also need to a lesser degree calcium, magnesium and other trace or supplemental nutrients, including vitamins and hormones.

These chemicals are often present in the soil and the plant draws them as needed or to the extent they are available in the soil. As the life of the plant goes on these chemicals deplete from the soil and depending on the plant it may need supplementary feeding. Lack of or an over-abundance of these or other chemicals may cause visual and physiological changes to the plant. Discoloration, wilting leaves and other deterioration of the leaves or plant more generally are common to nutrient deficient plants and thus are worthy of being considered if you want a visually appealing plant.

It is also sometimes necessary that plants be provided with pesticides such as insecticides, fungicides, mildewcides and other plant disease inhibiting or eradicating chemicals. These may be applied directly or in an aqueous liquid solution or mixture which may also be used to water plants.

A common practice for providing plants with light is by placing them near a window so that sunlight will shine in on the plant. Some of the light will reflect off of other items in the room depending on their finishes and colors, but there will typically be a stronger exposure on the side closest to the window through which light beams or otherwise becomes incident upon the plant in question. This situation often causes the plant to stretch and lean, positioning itself to best receive this light. Such makes the plant look ill-proportioned and unsightly, hanging to one side of the pot or other planter. This leaning or lopsidedness of the plant to one side of a planter or pot is generally considered an unappealing condition or characteristic of plants. This is especially true for plants that drape over the edge of a planter, but is a problem encountered with almost all plants grown inside where there is non-uniform incident light to the plant.

All of the aforementioned problems along with others require regular maintenance of indoor plants to help prevent or fix the particular problem or problems associated with each site. Thus, it is difficult to know when placing a planter and plant, what the plant health is going to be and many plants are lost by attempts to place them in unsuitable locations.

Some people employ others to take care of their plants, especially during an extended absence. Such may be an expense and also can put the owner or their property at risk for allowing someone into their living or office space. This is particularly true when maintenance is performed during vacations, off-hours or when otherwise done unsupervised.

Some or all of the problems explained above and other problems may be helped or solved by the inventions shown and described herein. Such inventions may also be utilized to other currently unknown benefits which may be in the future appreciated from the novel inventions shown and described herein.

BRIEF DESCRIPTION OF THE DRAWINGS

Preferred forms, configurations, embodiments and/or diagrams relating to and helping to describe preferred versions of the inventions are explained and characterized herein, often with reference to the accompanying drawings. The drawings and all features shown therein also serve as part of the disclosure of the inventions of the current application whether also described in text or by graphical disclosure alone. Such drawings are briefly described below.

DETAILED DESCRIPTION OF THE PREFERRED EMBODIMENTS

Table Listing Subsections of Detailed Description

Figure 1:
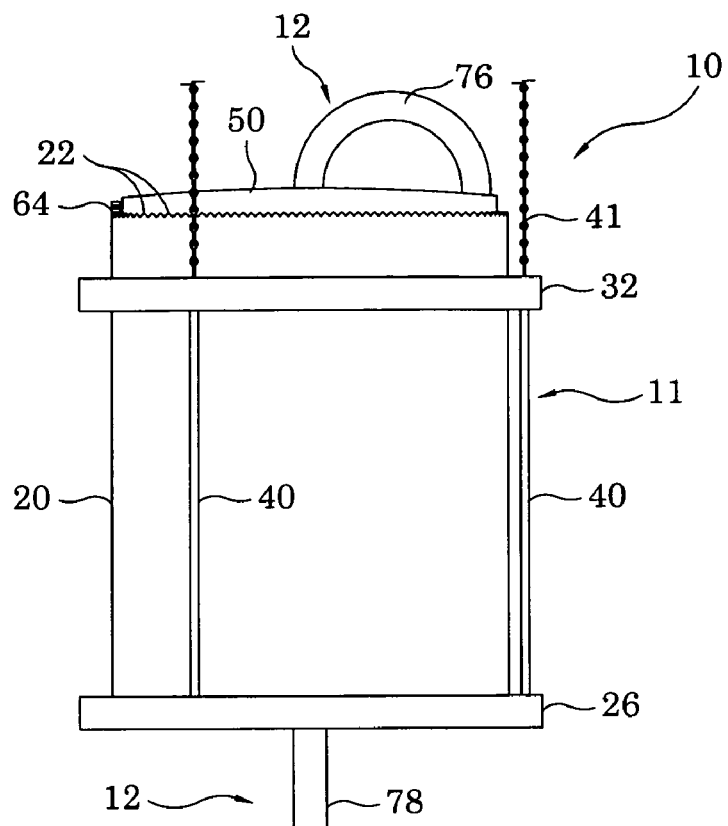
FIG. 1 is a front elevational view of one preferred embodiment according to the inventions hereof holding a potted plant held in a planter.
Figure 1:
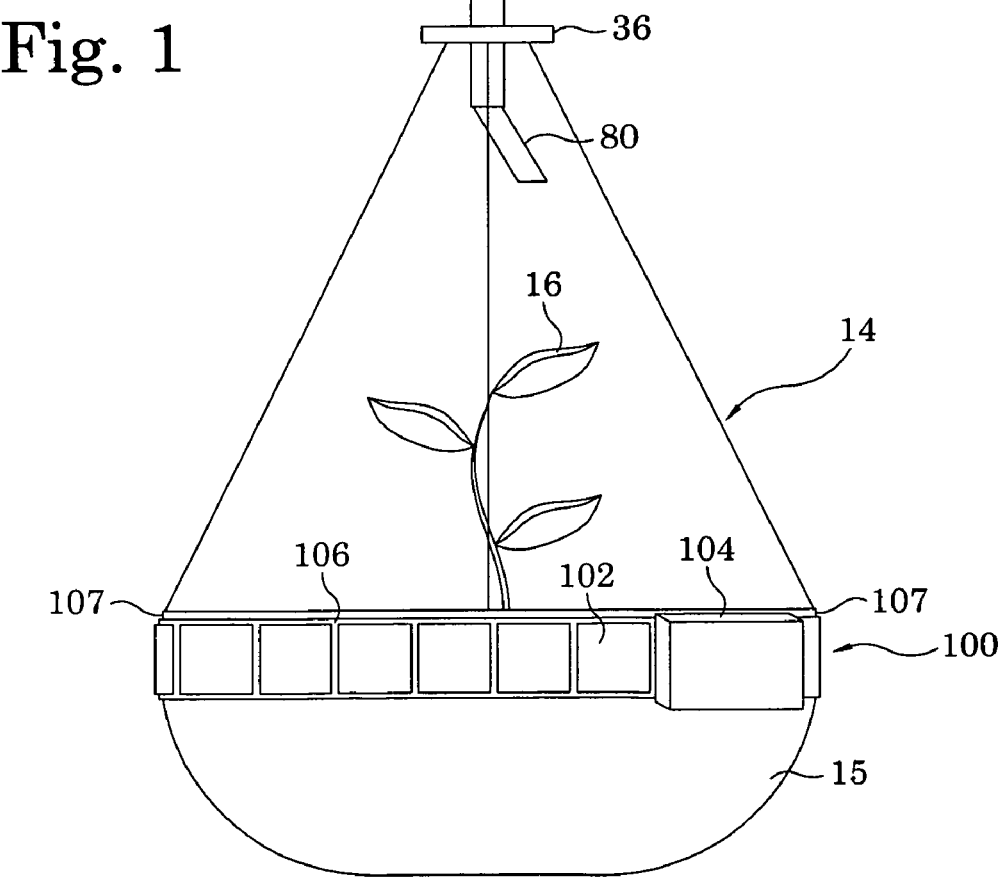

A table of subsections for the detail description is below.

| Table of Subsections |
|---|
| Table Listing Subsections of Detailed Description |
| Introductory Notes |
| General Configuration |
| Stationary or First Assembly |
| Rotating or Second Assembly |
| Rotary Drive |
| Preferred Combined Drive Plate and Cover |
| Alternative Drive Embodiment |
| Liquid Transfer |
| Electric Assembly Generally |
|     Power Generation and Storage Circuitry |
|     Voltage Regulation |
|     Clocking of Time |
|     Counters |
|     Output Timer Controls |
|     Pump and Rotator Drivers |
|     Operation of Rotator |
|     Low Water Indication |
|     Operational Indicator |
|     Ambient Light Sensor and Dark Condition Shutdown. |
|     Control Assembly and Electronics Operation |
| Peripheral Solar Cell Array |
| Planter Assembly With Mounted Components |
| Planter Assembly Add-On Solar Array |
| More About Methods Performed and Manners of Use |
|     Methods Concerning Complete Plant Maintenance |
|     Methods Concerning Rotating and Dispensing Liquid to a Planter |
|     Methods Concerning Controlled Rotational Motion of a Planter |
|     Methods Concerning Deliver of Liquids to a Planter |
|     Methods Concerning Stirring of Reservoir Contents |
|     Methods Concerning Driving the Rotating Assembly |
|     Methods Concerning Involving Liquid Level Detection |
|     Methods Concerning Solar Powering Configuration |
|     Methods Concerning Generating On-Board Electricity On a Planter |
|     Methods Concerning Fitting of Solar Array Upon Planter |
|     Methods Concerning Manner of Use |
| More about Preferred Manners of Making the Preferred Inventions |
| Interpretation Notes |

Introductory Notes

The readers of this document should understand that the embodiments described herein may rely on terminology used in any section of this document and other terms readily apparent from the drawings and the language common therefor as may be known in a particular art and such as known or indicated and provided by dictionaries. Dictionaries were used in the preparation of this document. Widely known and used in the preparation hereof are Webster's Third New International Dictionary (© 1993), The Oxford English Dictionary (Second Edition, ©1989), and The New Century Dictionary (©2001-2005), all of which are hereby incorporated by reference for interpretation of terms used herein and for application and use of words defined in such references to more adequately or aptly describe various features, aspects and concepts shown or otherwise described herein using more appropriate words having meanings applicable to such features, aspects and concepts.

This document is premised upon using one or more terms with one embodiment that may also apply to other embodiments for similar structures, functions, features and aspects of the invention. Wording used in the claims is also descriptive of the invention and the text of both claims and abstract are incorporated by reference into the description entirely in the form as originally filed. Terminology used with one, some or all embodiments may be used for describing and defining the technology and exclusive rights associated herewith.

The readers of this document should further understand that the embodiments described herein may rely on terminology and features used in any section or embodiment shown in this document and other terms readily apparent from the drawings and language common or proper therefor. This document is premised upon using one or more terms or features shown in one embodiment that may also apply to or be combined with other embodiments for similar structures, functions, features and aspects of the invention and provide additional embodiments of the inventions.

General Configuration

FIG. 1 shows an inventive apparatus 10 according to some preferred versions of the inventions described herein. Apparatus 10 includes a stationary assembly 11 and a rotating assembly 12. The rotating assembly 12 rotates relative to stationary assembly 11 to move a planter support 14 in a rotary, pivotal or other suitable rotational or other orientation changing action. The preferred rotational action is rotary action which is continuously in the same direction as used in current preferred versions. However such rotational or other reorienting action might also be done by pivotal oscillatory action in some versions to provide improved results or otherwise controlled to provide a useful and desired action or actions of the rotating assembly.

The planter support 14 supports a planter 15. The planter support can be lines, cables, ropes, rods, and other suitable hanging supports. The planter may be of a wide variety of shapes, colors, designs, decorations and other configurations. FIG. 1 shows a plant 16 growing in planter 15. Multiple plants may also be planted therein or multiple pots may be combined upon a planter tray. Various other configurations are possible.

Figure 4:
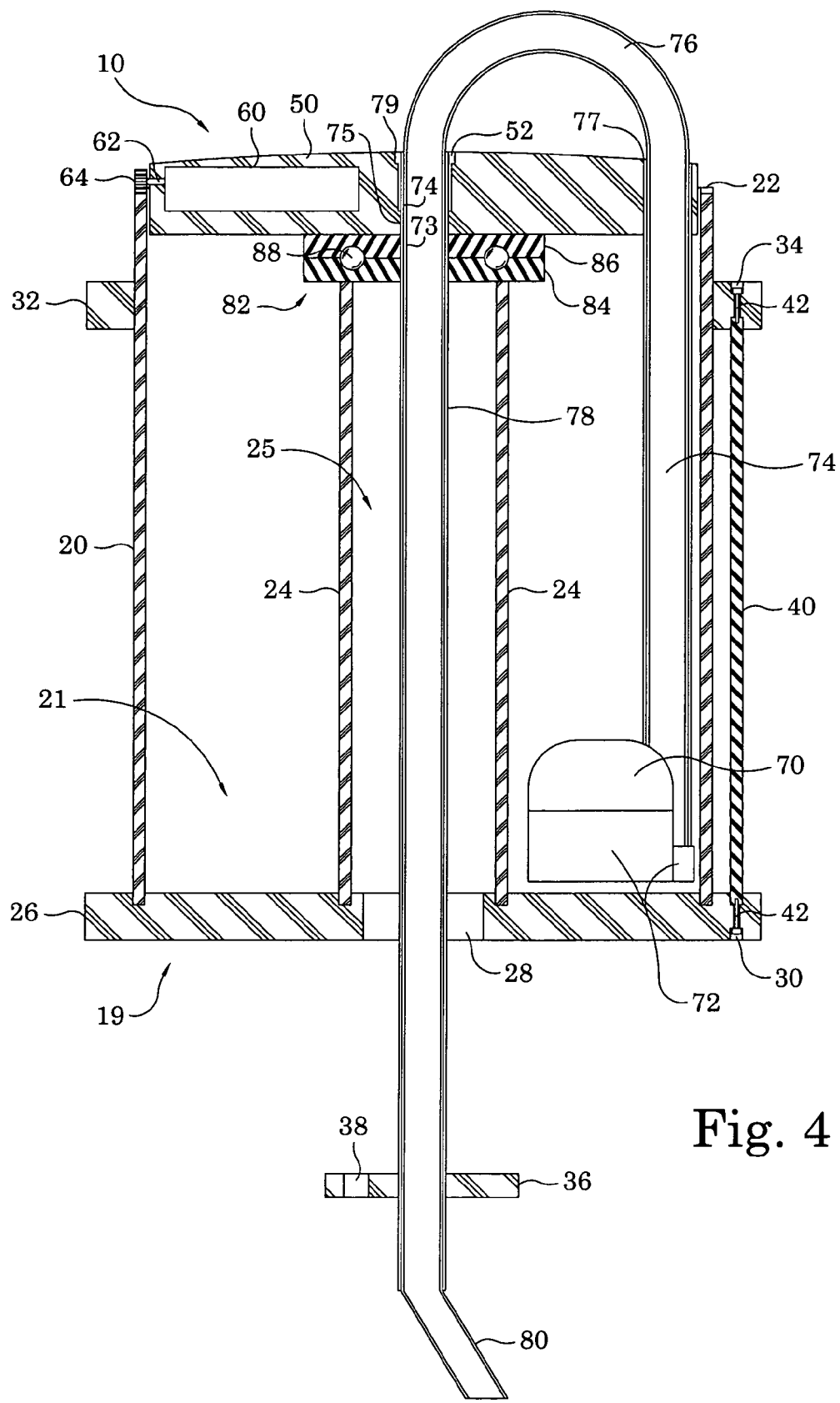
FIG. 4 is a cross-sectional view of the embodiment of FIG. 2 taken along line 4-4 of FIG. 3.

FIG. 4 shows that apparatus 10 also includes a reservoir 21 in which a liquid is held. Most commonly the liquid is water. The liquid can also include various plant nutrients, soil conditioners, pesticides and other additives that address a particular need or needs of a specific plant held in the one or more planters supported upon the apparatus rotating assembly.

An important advantage of apparatus 10 is that it includes an on-board electrical supply such as a generator and storage. This allows controlled rotation and liquid supply without external connections for water or electricity. This is important to allow the apparatus to be hung almost anywhere desired by the consumer or other users. The apparatuses are capable of being hung where there is sufficient clearance for turning of the planter and rotating assembly and sufficient vertical space to accommodate the apparatus, planter and any plant. Water and other constituents of the desired liquid are periodically poured into the reservoir 21 as desired and will be explained more below.

The preferred on-board electrical controls can be provided in different electrical configurations in addition to the currently preferred design shown herein. The on-board controller may be used to regulate the liquid supply to the planter and control operations for watering and rotating. These will be explained in greater detail below.

The controls may further be used to turn off the rotational or other operational functions at night or during periods of low light or other conditions when rotation or feeding is not needed or desired. This allows automatic care by apparatus 10 of plant maintenance for significant periods. The period of automatic care is only limited by the size of the reservoir and amount of water or other liquid contained therein.

Apparatus 10 takes care of common plant care needs reducing the amount of work the owner must perform and also helping to ensure that each feeding is given without initiation by the plant care provider and their schedule. It also helps to provide even growth upon all sides of the plant and planter without manual attendance and turning of a planter.

Stationary or First Assembly

The stationary or first assembly 11 includes a number of components in the preferred embodiment shown. An important part is a body 19 (see FIG. 4). The body may include structure which forms one or more reservoirs, preferably a single annular reservoir, such as reservoir 21. It further preferably includes a support upon which the rotating assembly is mounted to turn. Still further, the stationary assembly has features which function to help connect with hanging supports, such as hanging chains 41 shown in FIG. 1. Assembly 11 may also be otherwise adapted for suspension.

As shown, body 19 is preferably constructed to include an outer wall or walls 20. In the illustrated embodiment, the outer wall is a cylindrically shaped sidewall 20 which is preferably the outer wall of the reservoir 21. Other shapes of outer wall or walls may also prove to be useful and suitable.

Further the stationary body includes an inner wall or walls 24. The inner wall or walls provide a cavity or conduit through which other components extend. In particular, FIG. 4 shows portions of the rotating assembly extending through the interior cavity 25 within the inner wall 24 or other inner walls. The inner walls further serve as an inner wall for the reservoir 21. In the construction shown, the inner wall or walls still further serve in the capacity of being a support for the bearing assembly 82 which allows easy rotation or pivotal action of the rotating or second assembly 11. The inner wall can be formed as a tube of various cross-sectional shapes and sizes, such as cylindrical, octagonal, etc.

The body can be constructed to allow assembly and disassembly using discrete components which are connected by fasteners or otherwise. This is advantageously done using inner and outer walls 20 and 24. The outer portion of the body also is fitted with a flange 32 which is part of or securely affixed to the outer wall 20. Connecting rods 40 extend between the flange 32 and a flange formed by the bottom piece 26 extending outwardly beyond outer wall 20.

The inner wall is a tube which may be threaded into the base piece 26, received in a groove, flanged with fasteners, bayonet connection, or other suitable types of connections which are so constructed as to form a seal. For example, use of a tapered threaded pipe received within a tapered threaded opening will tighten into a sealing relationship. Such various connections may in some cases also be appropriately used for the outer wall or other pieces of the apparatus.

As shown, the outer wall structure can in this construction be received in receiving grooves or other sealing connections formed upon the upper surface or portion of bottom piece 26 (see FIG. 4). The outer sidewall 20 is then connected and adhered or friction fit and sealed or held mechanically by tension rods 40.

FIG. 1 shows the stationary assembly is held together by fasteners 42 which extend though apertures 34 in upper flange 32 and apertures 30 in the bottom flange formed by the peripheral portions of the bottom piece 26. Such fasteners 42 extend through such apertures and connect to the assembly rods 40 which both properly space and take tension used to keep the stationary assembly body mated together and remain intact.

The body parts may be disassembled by removing fasteners 42 from connection with tension rods 40. The walls 20 and 24 are then disconnected from the base bottom piece 26 depending upon the respective connections.

Figure 2:
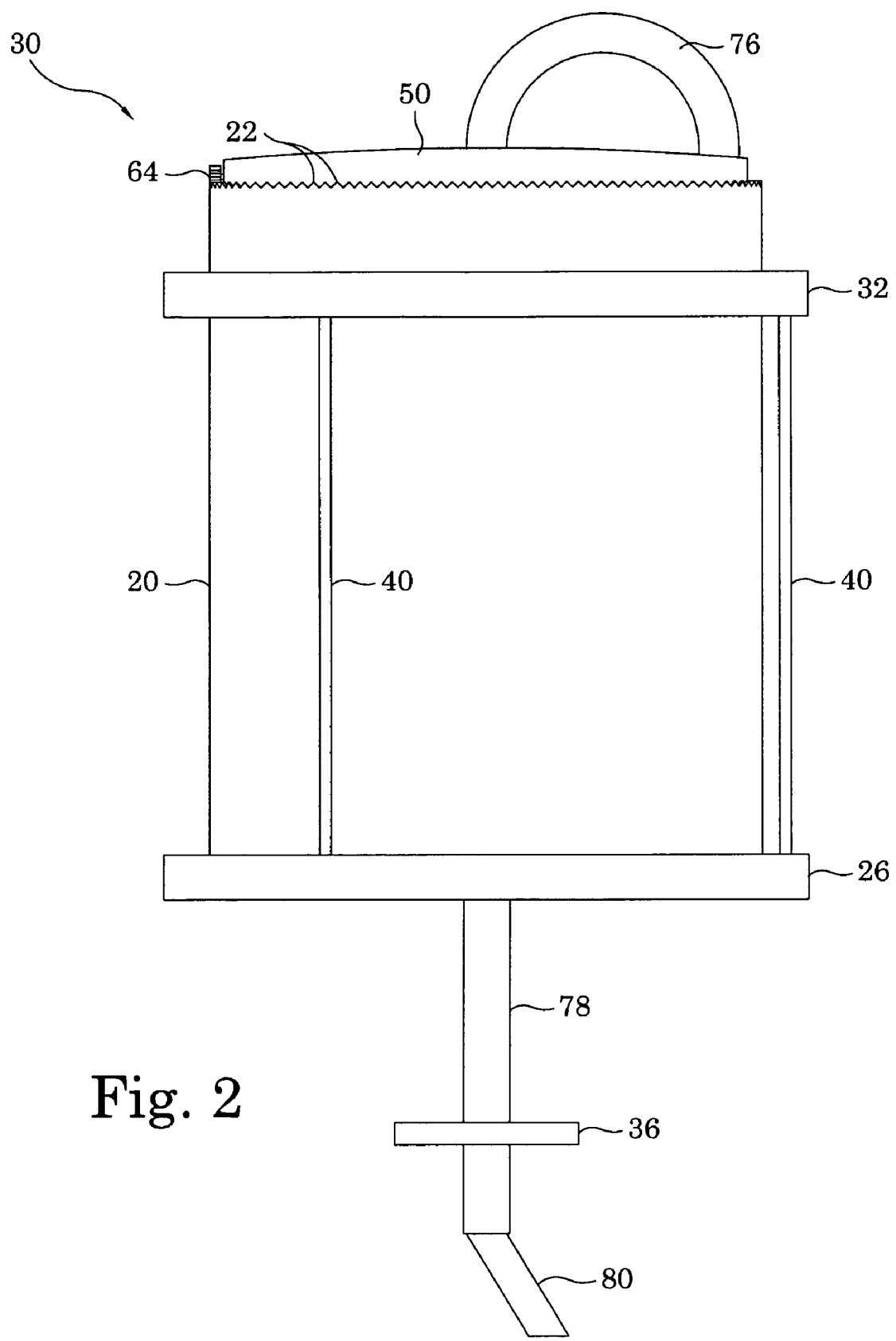
FIG. 2 is a front elevational view of the apparatus shown in FIG. 1 taken in isolation and without the planter, plant and other portions to better show the apparatus of FIG. 1.

FIG. 2 also shows that outer wall 20 preferably has gear teeth 22 or other meshing features cut into the outer wall, such as at the upper rim of the outer wall. These are used in this embodiment to be engaged by the teeth of a pinion gear 64 forming part of the drive as is further explained below. Other drive connections may alternatively be used.

FIG. 1 shows hanging lines 41 which represent various types of lines, such as chains, cables, cords, twine, and many other types of hanging lines from which apparatus 10 may be hung from a ceiling or other hanging support or fixture (not shown).

FIGS. 1 and 4 together indicate that the hanging support lines 41 can be conveniently connected to the stationary assembly at holes 34 using the fasteners 42. Other means for attaching the support lines 41 to the stationary assembly may be suitable. It is preferred to hang the apparatus 10 using the flange 32 which provides greater strength at the point of support and helps to more evenly distribute the stress to the stationary assembly. Other hanging connections may be used or required depending upon the specifics of the body used or other features of the stationary assembly.

Rotating or Second Assembly

The preferred apparatus 10 has a rotating or second assembly 12 which is mounted for rotary action or other angular movement relative to the stationary assembly 11. Such motion is preferably angular rotational motion in one form or another. This includes the preferred continuous rotational angular movement, alternative oscillatory pivotal movement, or various other alternative rotational movement patterns that my apply to help provide even plant growth on all or particular sides of a plant, or other plant growth objectives. The ability to use various operational modes may apply for short term or may be used long term. This may be done either to provide optimal plant light exposure or exposure of the solar cells, if such becomes a priority during some or all operational conditions.

The rotating assembly 12 may include rotational portions of a support bearing 82, a combined drive plate and/or cover 50, or such parts in separate form, part or all of the liquid transfer system, the planter hanger support piece 36, and some other components as indicated elsewhere herein or as needed in an alternative embodiment according to the inventions described herein. The rotating assembly provides for the rotation of the planter support and any installed planter which may contain a plant or plants therein.

The rotating assembly may also serve to stir or mix the water or other liquid being fed to the planter and be used to direct the discharge of liquid onto the planter, such as by using off-set discharge 80 (FIG. 4). It may further guide electrical or other control wires through an aperture 38 which rotates with the rotating planter holder and any planter.

Rotary Drive

The apparatus 10 preferably has a drive system which is used to change the relative angular positions or relative orientations of the stationary and rotational assemblies. Although a specific construction is shown using placement of different components in the preferred construction, there are alternatives which may reduce or remove portions of other subsystems so they may be on the opposing assembly, or in some versions components may no longer be considered essential. This is exemplified with regard to the alternative drive configuration in the alternative embodiment shown and described further hereinbelow.

In the preferred constructions shown, a drive plate 50 is part of the rotating assembly. Drive plate 50 is attached to and advantageously totally or mostly supported upon the top of inner wall 24 via bearing 82. Lower bearing portion 84 is secured to a stationary assembly part, such as the top of tubular member 24. This is advantageously done in the embodiments pictured by using a bearing assembly 82 having ball bearings 88 that travel, preferably perform by rolling, in opposing races of the complimentary bearing parts 84 and 86. The upper bearing portion 86 is attached to the bottom of the rotating drive plate and the lower bearing portion 84 is conveniently attached to the inner wall 24 otherwise suitably mounted.

Ball bearings 88 allow for the free rotation of the drive plate separate from the stationary assembly. Bearing 82 has a center hole allowing for passage of a downward feed conduit 78 through which the transfer tube or line 76 is positioned.

In apparatus 10, the drive plate 50 has an internal chamber for motor 60. Such internal chamber need not be fully enclosed but there are advantages to doing so. The motor is better protected when water or other liquid is poured onto the drive plate cover. The motor chamber houses and supports the motor, which in this case is a high torque, low voltage motor.

Motor 60 has a drive output in the form of a pinion gear 64 mounted upon the motor output shaft 62. The motor drive shaft 62 extends from the motor to the edge of the outer wall 20 to appropriately position the pinion teeth to mesh with the stationary assembly teeth, such as top edge teeth 22. As the motor turns, the pinion gear rotates along the teeth 22 cut into outer wall, thus rotating the drive plate and remaining parts of the rotating assembly.

Preferred Combined Drive Plate and Cover

Figure 3:
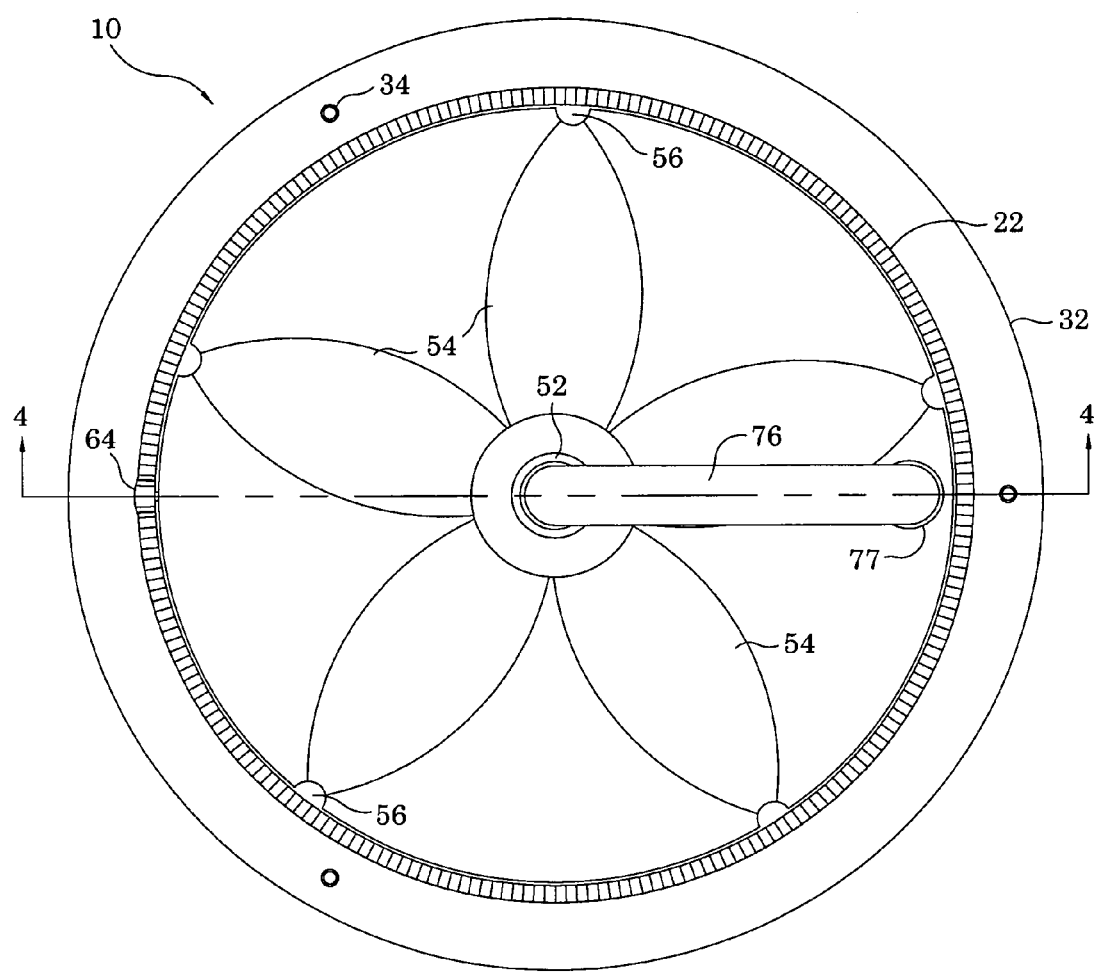
FIG. 3 is a top view of the embodiment of FIG. 2.

Drive plate 50 can also serve as a reservoir cover and/or refill channeling device or other more generalized cover. FIG. 3 shows a cover/drive plate 50 having channels 54 advantageously formed in a desirable pattern, such as the five pedal design array simulating a flower shown best in FIG. 3. Both the area surrounding channels 54 and between them are convex or otherwise configured to cause liquid poured onto the cover to run outwardly or otherwise so as to direct the water or other liquid to holes or passages 56 that feed the liquid being used to fill the reservoir is poured into the apparatus.

Cover 50 also preferably includes drain passages 56 which are in the illustrated design peripheral recesses or cutouts. The drive plate cover is domed or convex upon the upper surface 52 to aid in the refilling of reservoir 21 with a desired liquid. During refilling, the solution is poured onto the upwardly convex drive plate 50. From there the water moves towards the outer edge due to gravity, the preferred convex shape of the upper surface of the drive plate and the channels 54. The peripheral cutouts 56 serve effectively as drains and down spouts, where liquid being supplied to the reservoir falls or runs therethrough and drains into the reservoir 21.

Drive plate 50 also has two vertical holes. A center hole which is fit with an engagement piece 52. Such has a central passage which is threaded toward the bottom allowing for easy attachment with a downward feed shaft 78 discussed later. The outer hole allows for passage of a upward feed shaft 74, also discussed later.

Alternative Drive Embodiment

Figure 15:
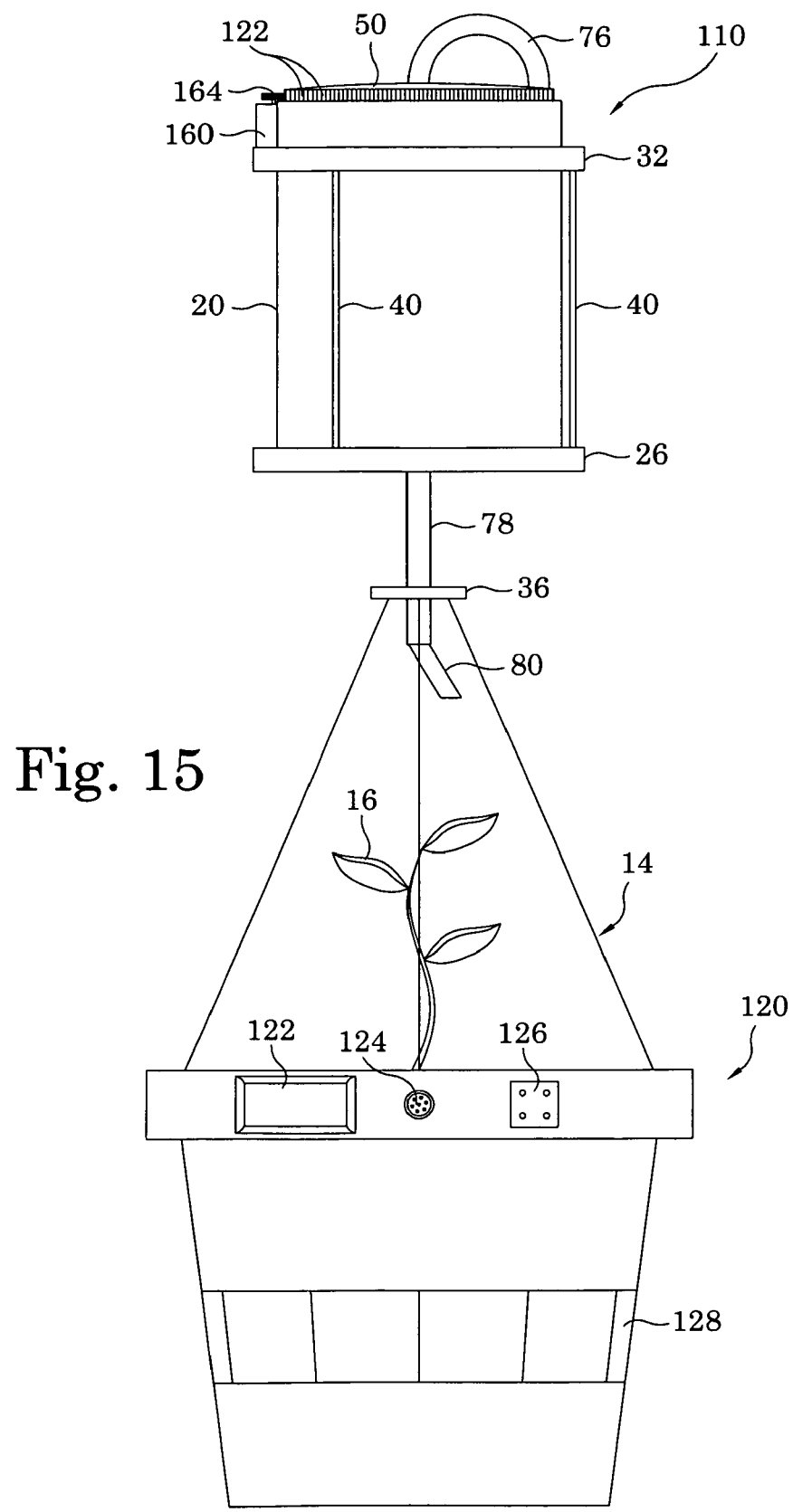
FIG. 15 is a front elevational view of another embodiment of the inventions using the planter illustrated in FIG. 11.

FIG. 15 shows an alternative construction of the assembly wherein the drive motor 160 is mounted to the stationary assembly. As shown, motor 160 is mounted to the outer wall 20, preferably above the flange 32 for structural strength and positioning pinion 164 to engage with teeth 122. Teeth 122 are formed upon and preferably about the periphery of the cover 50, such as along the edge of cover 50. Other arrangement and drive systems now known or hereafter developed may also be suitable.

Otherwise the apparatus 110 is the same or similar to the other embodiments described above. It also is shown using planter 120 hung from the planter suspension piece or flange 36.

Liquid Transfer

A pump 70 is advantageously contained in a pump housing 72. The currently preferred pump is powered by the solar energy stored in the battery. The currently used pump also is selected to have a magnetically driven or coupled impeller to provide minimal maintenance. Other pump types are possible.

Pump housing 72 is advantageously configured to be suspended in reservoir 21. This is done using a support tube 75 which is advantageously fit into a suitably shaped aperture 77. The liquid transfer tube 76 extends with the pump support tube 75. The lower end of the output conduit is secured to a pump output port on the pump housing. The upper portion of the pump output conduit 74 passes through the outer hole 77 in drive plate 50 and is secured thereto by friction or other suitable types of connections (not shown).

The upper portion of the output conduit is attached to or integrated with a transfer tube 76. The opposite end of the transfer tube 76 is secured to a supporting engagement piece or ferrule 52 which supports the tube where it passes through the drive or cover piece 50 at a aperture 79. The depending portion of the feed or transfer tube 73 is within a preferred downward feed shaft 78 supported in aperture 79 by ferrule 52.

Stirring Assembly

As the drive plate rotates so do the outward feed tube and pump. Being suspended in reservoir 21 to form a stirring assembly. As they rotate they stir up the present solution advantageously reducing algae build-up common to stationary water. Downward feed shaft 78 is secured to engagement piece 52 and runs down through the central hole in bearing 82 and through central chamber 25 down to a distribution tube 80 connected or integral with descending transfer tube portion 73.

Downward feed shaft 78 also preferably has plant hanger 36 secured thereto such as by friction or adhesive from which the planter is hung and preferably secured via holes 38. A central hole in the plant hanger allows passage of the downward feed shaft.

Distribution tube portion 80 controls how the solution is dispensed to the plant. It is shown as being a short angled tube however it may also be of other forms if found to be desired or advantageous. For example, a long tube may be preferred to snake down along the support lines for the planter and be discharged close to the plant upon the soil. Other discharge configurations are possible and may be desirable. This may be advantageous in that it doesn't drip water on the foliage of the plant and may reduce splashing.

Electric Assembly Generally

The apparatus uses a solar electricity generator, such as one or more solar cell arrays combined with battery storage therefore to provide the apparatus with adequate power to function while remaining self-sustaining to allow for hanging virtually anywhere for use and have automatic action for weeks or longer depending on the plant and reservoir capacity. A preferred solar collector or cell type is photovoltaic. However, other types or future solar cells which act to generate electricity may be suitable for use in the inventions according hereto.

As shown, a photovoltaic solar cell array provides the energy to run the pump, motor, chips and any other electrical needs. This allows the apparatus to be completely portable. By advantageously using the already present light as an energy source, the apparatus may operate without having to frequently change batteries or make use of a wall electrical plug.

Light intensity on the solar array can also help regulate the rotation of the plant. High light intensity would cause the motor voltage output by the generator and storage battery to rotate faster which is advantageous for the plant for even light exposure. Similarly, when the light intensity is lower, rotation is not needed. A battery provides storage of charge and allows for the chip components to have a nearly constant voltage, some components need such a charge to effectively record time intervals or similar no matter the light intensity.

Control Assembly and Electronics

Figure 5A:
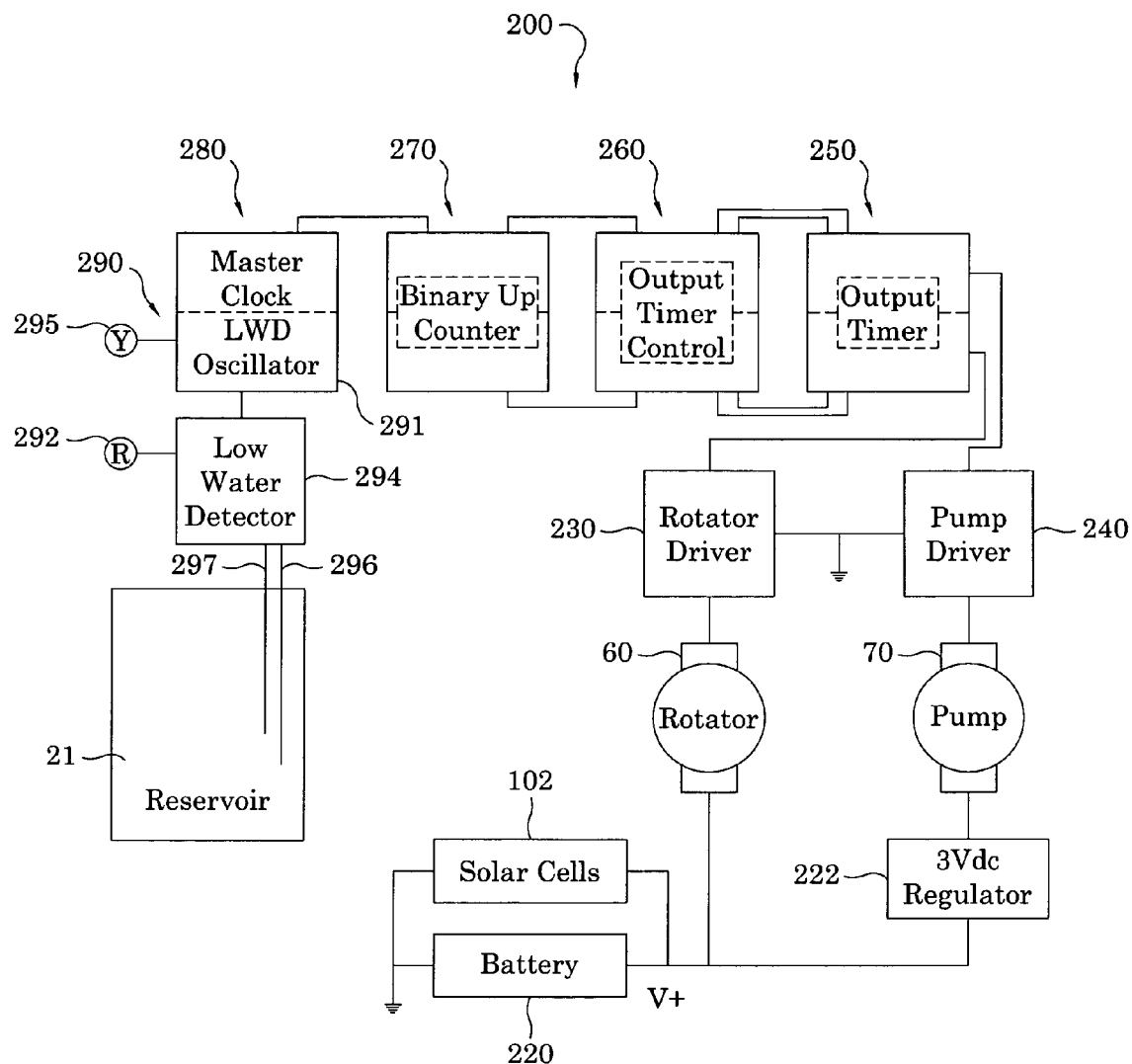
FIG. 5A is a block diagram illustrating preferred electronics used in a preferred form of the invention.

The apparatus advantageously utilizes an electronic system for operation and control which is shown diagrammatically in FIG. 5A.

Power Generation and Storage Circuitry

FIG. 5A shows currently preferred circuitry for power generation and storage. This is accomplished using solar cells 102 connected in parallel with the storage batter 220.

Voltage Regulation

The particular pump 70 operates on 3VDC power so a voltage regulator 222 is between the power generation and storage, which together form a power supply. Other portions of the system work at a bit higher voltage such as in the range of 5-10 VDC. Currently illustrated circuitry operates at about 7VDC, or optimal 7.5 for the fully charged nickel metal hydride battery used in the power supply.

Clocking of Time

FIG. 5A shows a master clock 280 which outputs a clocking signal of relatively low frequency. The clocking signal is connected to a binary up counter 270 which counts the reoccurring clocking signal.

Counters

In the embodiment shown, the counter 270 is more precisely two parallel binary up counters 271 and 272 for the pump control and rotator control, respectively. The counters have output signals 202 and 203 (FIG. 5B) which function to provide summation of clock periods to provide an indication of a greater period of time for both the pump and rotation timer controls 260.

Output Timer Controls

The timer controls 260 provide two parallel timer controls 261 and 262 for the rotator and pump, respectively. And thus an output signal from each can be adjusted as needed for operation of those respective pieces of the apparatus.

The timer controls 260 are connected to the output timers 250, having parallel timers 251 and 252 for the rotator and pump, respectively.

Pump and Rotator Drivers

The rotator driver 230 is effectively a controlled switch which provides power to the rotator based on a control signal from timer 251. The relatively larger current draw is thus switched on or off dependent upon adjusted time of operation and non-operation.

The pump driver 240 is similar to driver 230 except the pump is controlled to determine the discharge of liquid through the discharge 80.

Operation of Rotator

The rotator is the drive which turns the rotational assembly relative to the stationary assembly. In the illustrations: the motor 60, motor shaft 62 and pinion 64 are provided. Pinion 64 engages the stationary assembly. Teeth 22 form mechanical parts of the rotator. This rotation is controllable by the rotator driver 230 as explained above.

Figure 9:
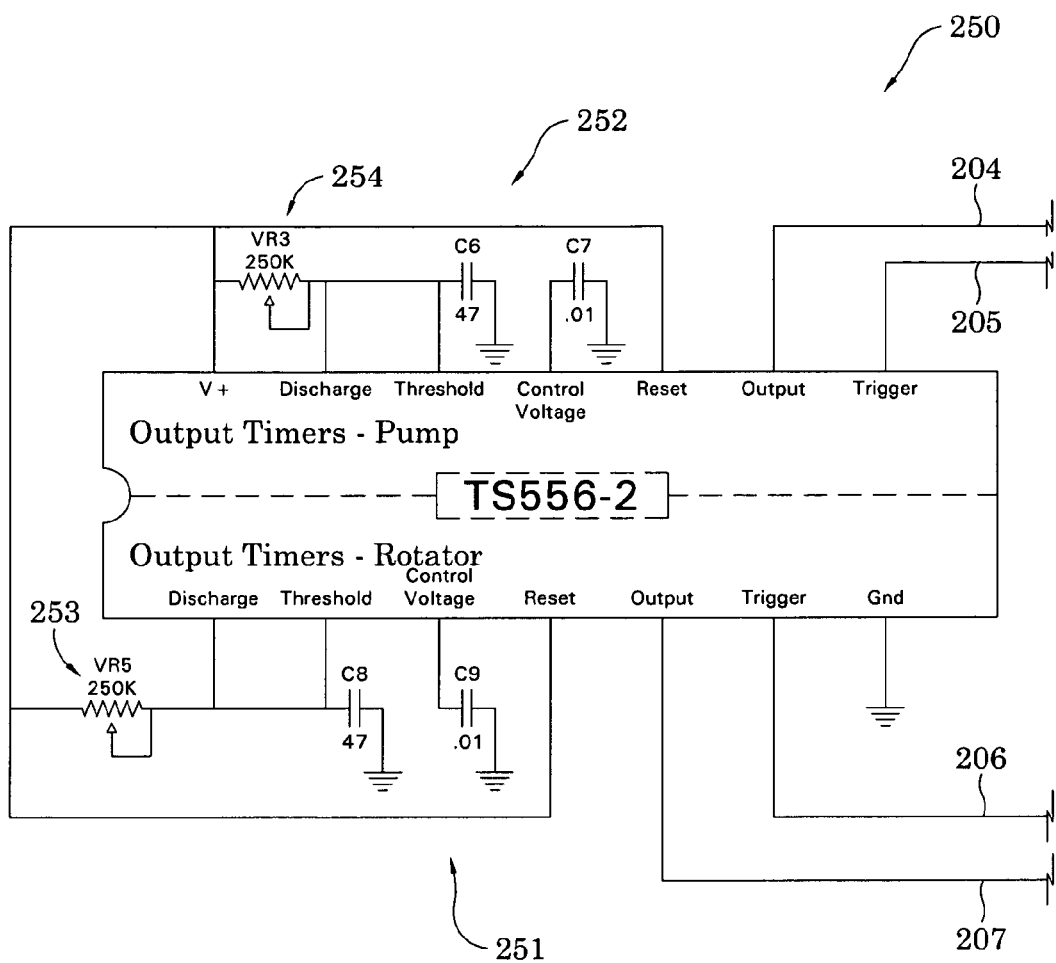
FIG. 9 is an enlarged detail diagram showing box 9 of FIG. 5B in isolation.

A suitable period of time for rotating the rotational assembly is on the order of days or even weeks and thus the power consumed is relatively small. The period for one revolution will vary and is adjustable by turning a potentiometer 253 (FIG. 9). FIG. 9 also shows similar potentiometer 254 for controlling the pump.

Figure 5B:
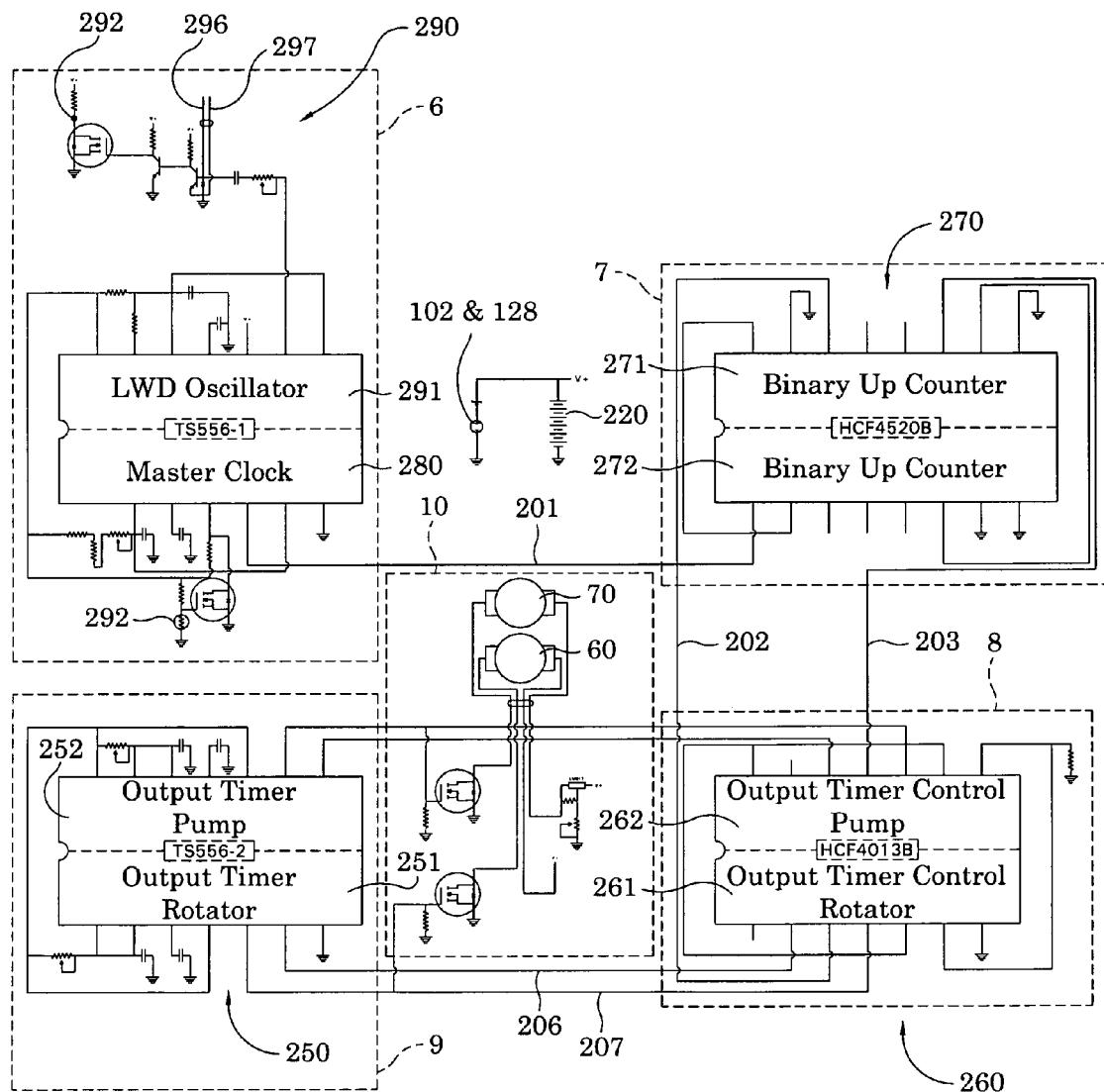
FIG. 5B is an overall schematic drawing showing the relative relationship of a preferred controller and other components which are illustrated to larger scale in FIGS. 6-10 according to a currently preferred form of the inventions described herein.

The output timer is in fact two different timers as shown in FIGS. 5B and 9. A rotator operation timer 251 and a pump operation timer 252 provide the direct control of their respective rotator and pump.

Low Water Indication

Figure 6:
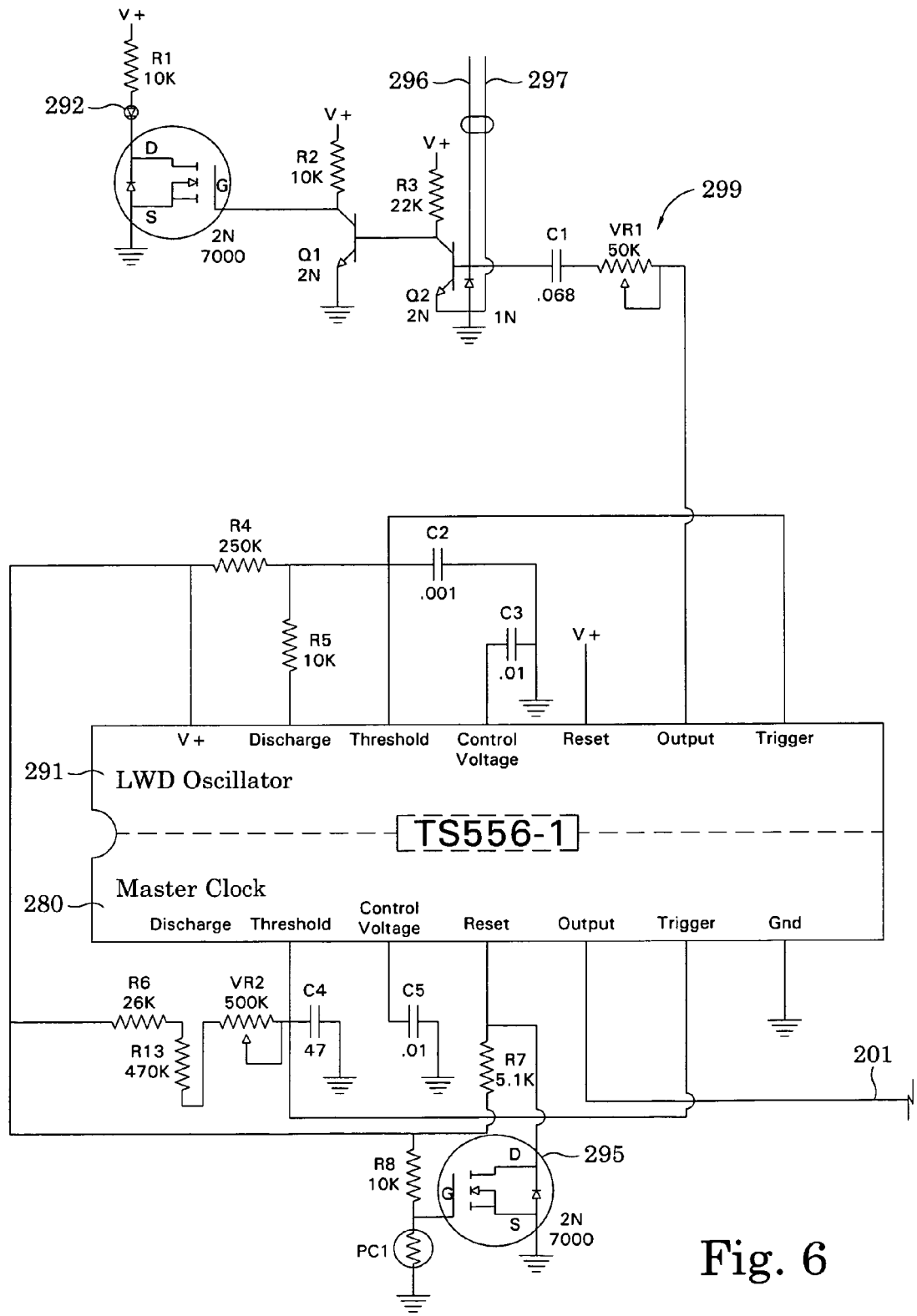
FIG. 6 is an enlarged detail diagram showing box 6 of FIG. 5B in isolation.
Figure 7:
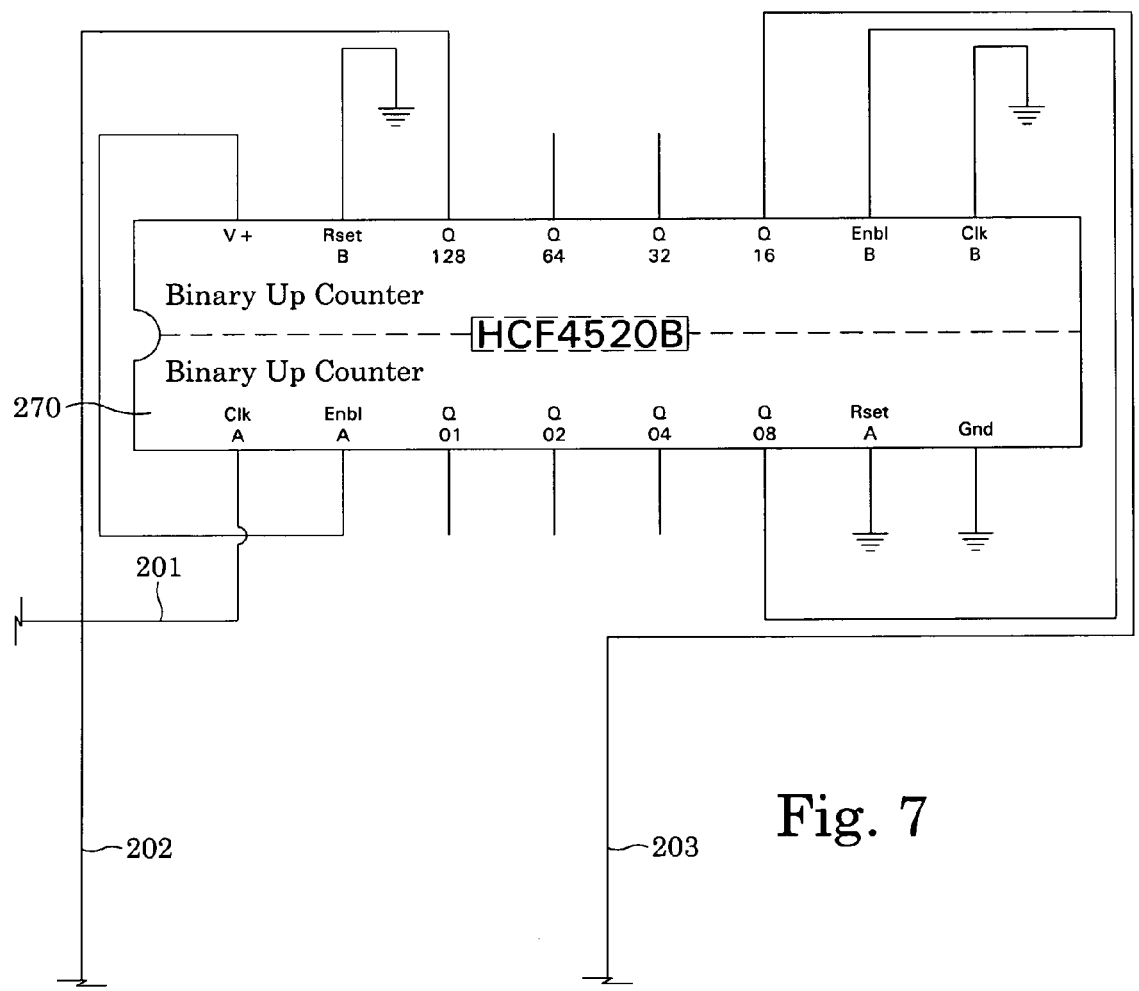
FIG. 7 is an enlarged detail diagram showing box 7 of FIG. 5B in isolation.
Figure 8:
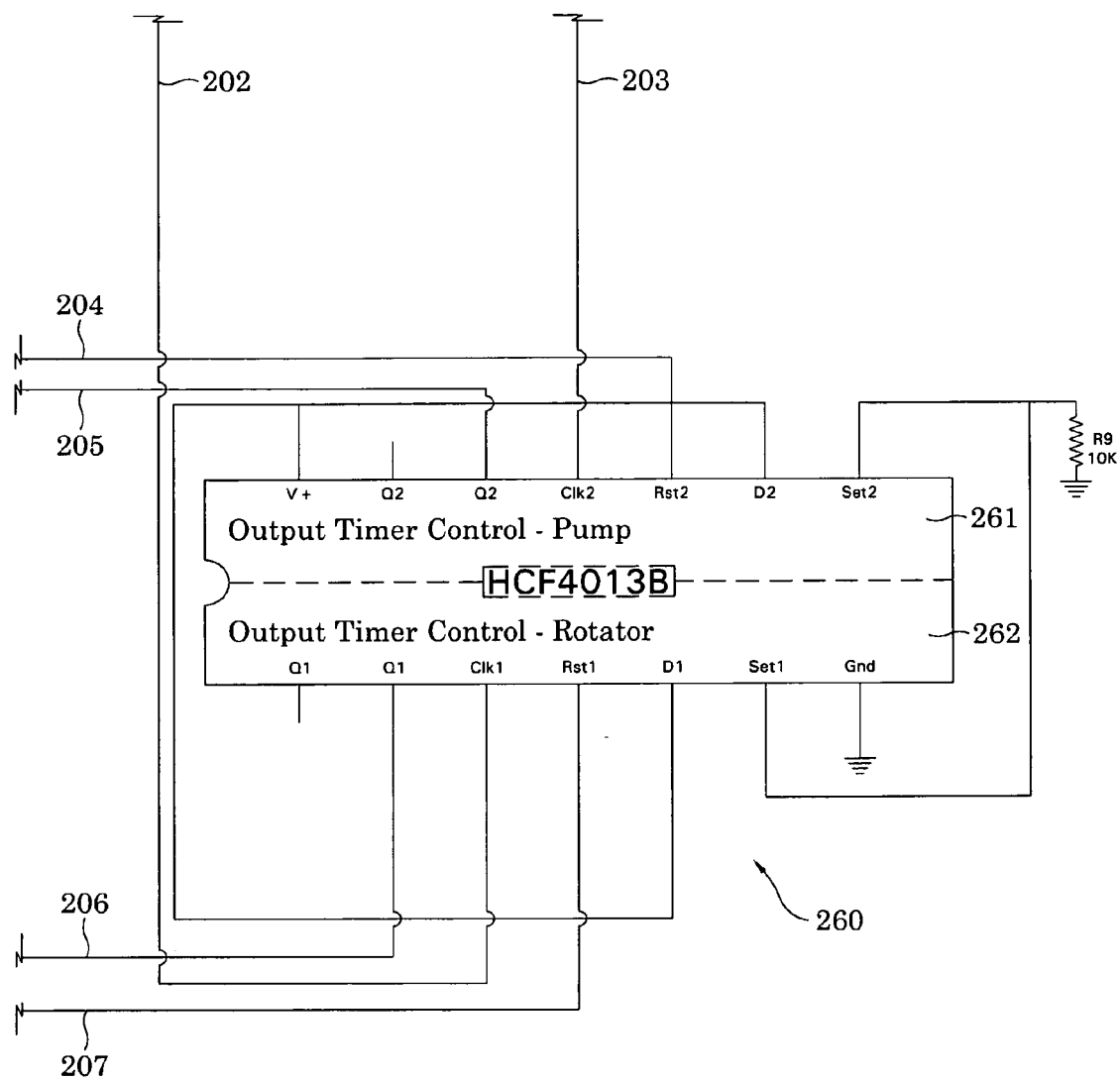
FIG. 8 is an enlarged detail diagram showing box 8 of FIG. 5B in isolation.

FIG. 5A shows a low water detector 290 having a visual or other appropriate indicator, such as the light emitting diode 292. Indicator light 292 advantageously turns red when the water or other liquid in the reservoir 21 has reached a desired set point level. The low water indicator has, in the currently preferred version, been constructed using a low water oscillator 291 which is connected to electrodes 296 and 297, such as detailed in FIG. 6. The low frequency oscillator 291 provides a stimulating signal to the electrodes. Suitable detection circuitry activates the indicator when such preferably adjustable set point is reached. In FIG. 6 a potentiometer 299 allows adjustment.

Operational Indicator

FIG. 5A indicates that the master clock 280 is connected to optionally indicate that the apparatus is working electronically. The indicator light 292 is switched by field effect transistor (FET) 293 which controls operation of the indicator light. This is preferably done on an intermittent basis to conserve energy.

Ambient Light Sensor and Dark Condition Shutdown.

Figure 10:
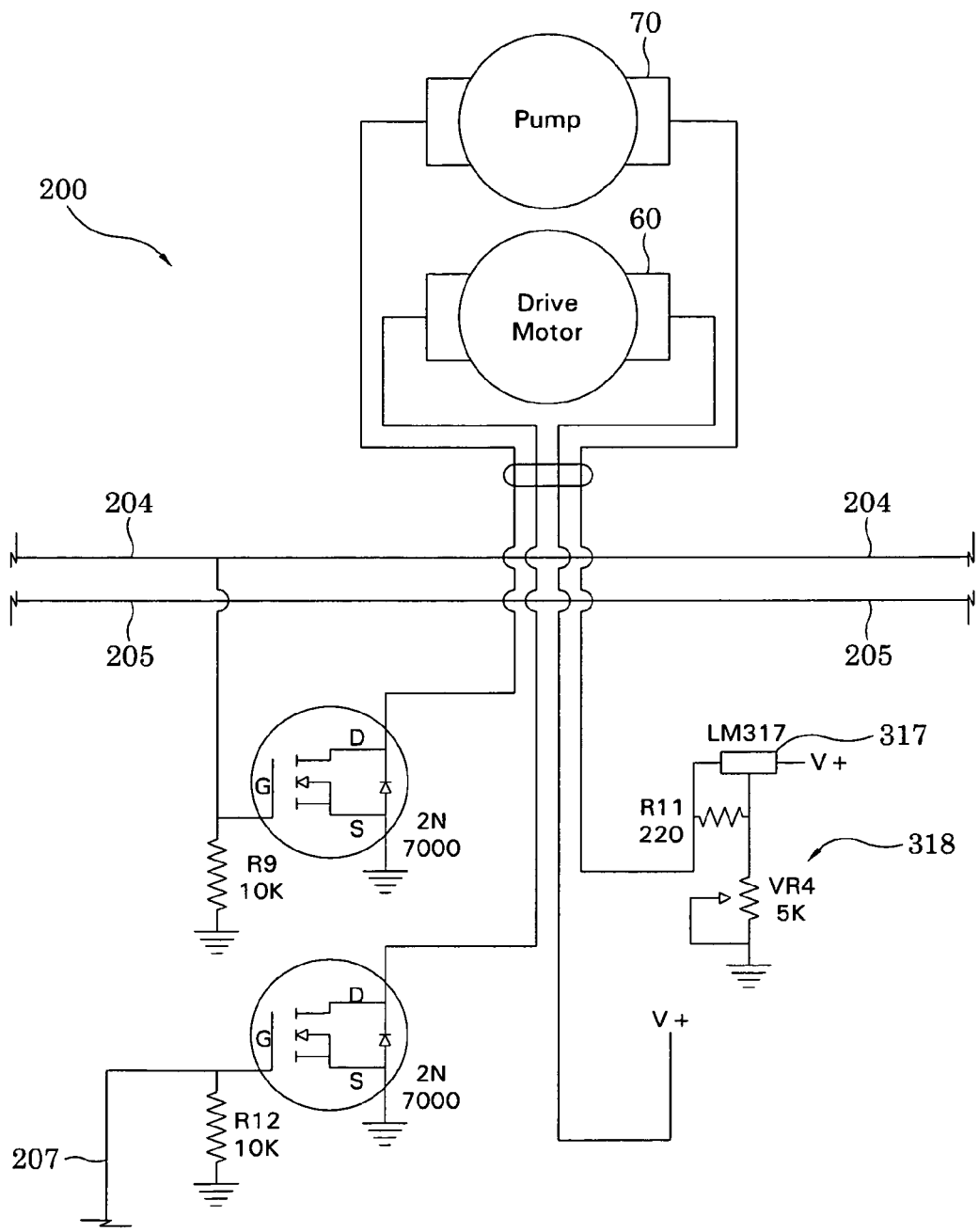
FIG. 10 is an enlarged detail diagram showing box 10 of FIG. 5B in isolation.

To stop operation during periods where the solar cells are producing little or no current, the preferred apparatus includes an ambient light sensor. This can be provided in various ways. As shown, the ambient light sensor is in the form of a photo resistor 317 (FIG. 10) which is adjustable by potentiometer 318 to set the ambient light threshold at which operation of the pump, rotator and electronics are shut down to the degree possible to permit the battery to hold charge and maintain the circuitry in a standby mode awaiting the next period of sufficient ambient light.

Control Assembly and Electronics Operation

The apparatus advantageously utilizes an electronic control system as described above to provide desired periods of watering which will vary dependent upon the planter volume being watered and the ambient conditions under which the planter is exposed, bright direct light versus a location where there is only reflected light striking the apparatus. It may also vary on other factors such as rotator period, plant type, plant size, number and water uptake, and other factors. These controls are illustrated for one embodiment shown in FIG. 15 as potentiometer set 126.

Peripheral Solar Cell Array

FIG. 1 shows a configuration wherein a planter 15 is supported by a planter support ring 107 which hangs upon the planter suspension lines and which together form the planter support 14. The support ring may be fitted with a solar array band assembly 100 described below and illustrated in FIG. 1 mounted upon the planter support ring 107.

Advantages of solar array 100 include that it is detachable and provides solar cells which extend about the margin or periphery of the support ring 107 or other planter support mounting piece. In this configuration there are active cells from the solar cells 102 in various or all angular positions of the solar array. This is significant in that there are always cells that are directed to best receive solar energy and convert it to electricity over the range of relative angular positions of the stationary and rotational assemblies and for various orientations of incident light beaming onto the solar cells. This incident light may be either direct sunlight or reflected light depending upon the angular position and location of apparatus 10 as used in the almost limitless various configurations which may occur during actual use.

Planter Assembly with Mounted Components

Figure 11:
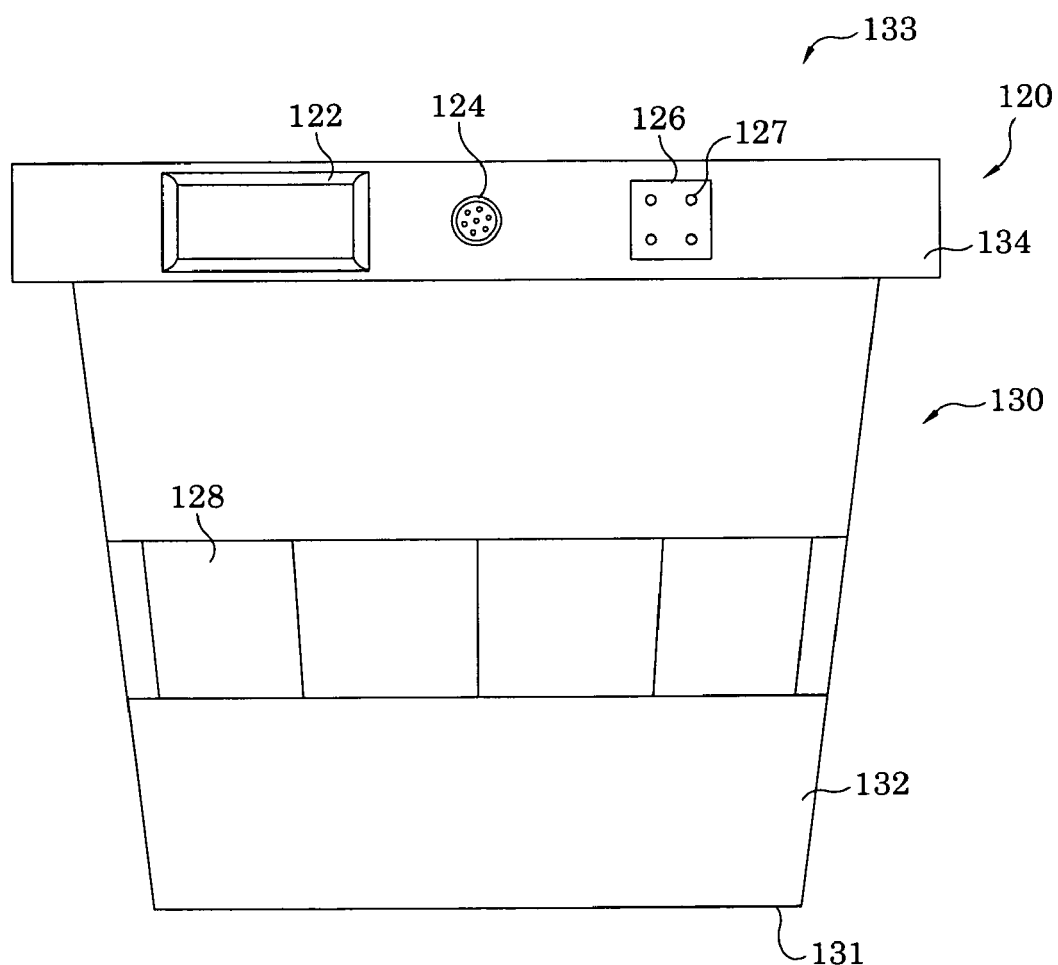
FIG. 11 is a front elevational view of a planter apparatus according to other inventions hereof.

FIG. 11 shows a novel planter assembly 120 that is constructed according to a preferred form of the inventions. Planter assembly 120 is adapted to be used in the assembly shown in FIG. 15.

Planter assembly 120 includes a pot or planter body 130. As shown, planter body 130 includes a bottom wall 131 which is joined to one or more sidewalls, such as sidewall 132. Sidewall 132 is an inverted frusto-conical shape with the bottom wall joined along the bottom edge of the frustum defined by sidewall 132.

Planter assembly 120 has an electronics module 122 which is advantageously mounted on the rim 131 of the planter body 130. The electronics module 122 may contain some, most, or all of the electronics.

A cable (not shown in FIG. 11) contain power wires and the low water detector electrodes may be detachably connected at a wire cable connection jack 124. Part 126 has adjustment potentiometers for adjusting cycle time, tuning the low water detector, adjusting rotational speed, and any other desired adjustment as explained more in connection with the description of the electronics.

Planter Assembly Add-On Solar Array

Figure 12:
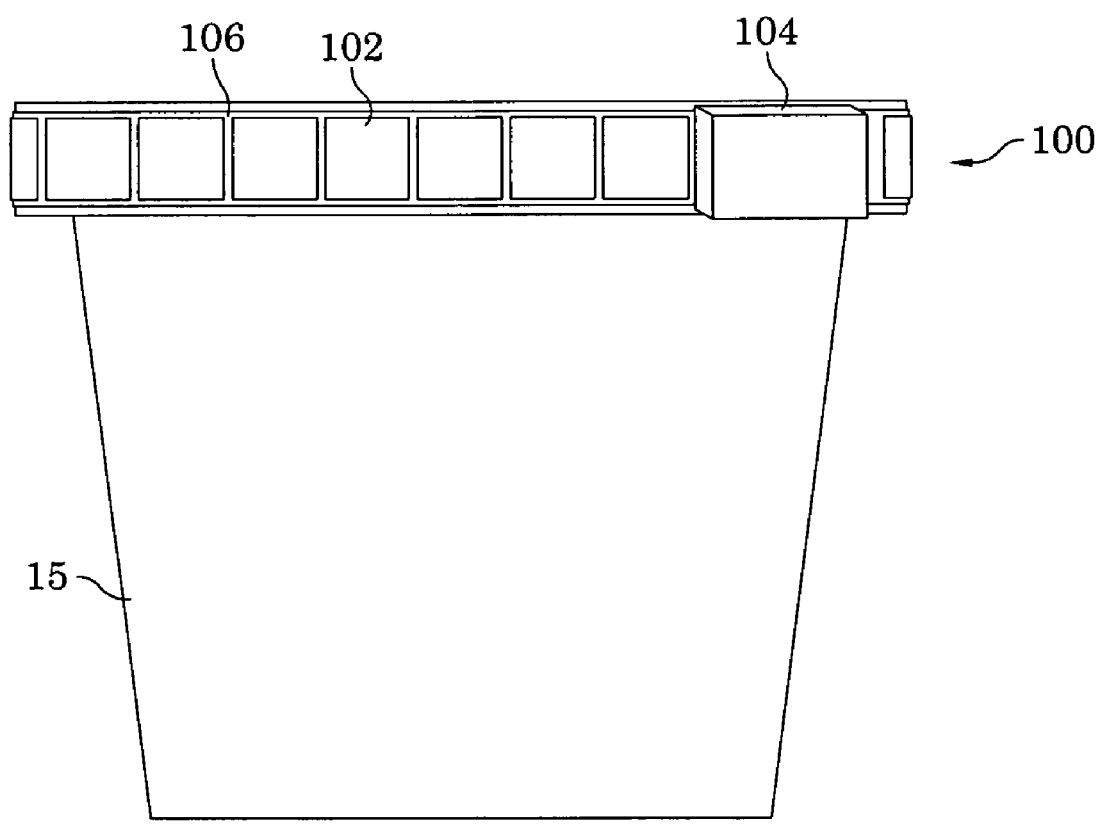
FIG. 12 is a front elevational view of another planter apparatus according to other aspects of the inventions hereof.
Figure 14:
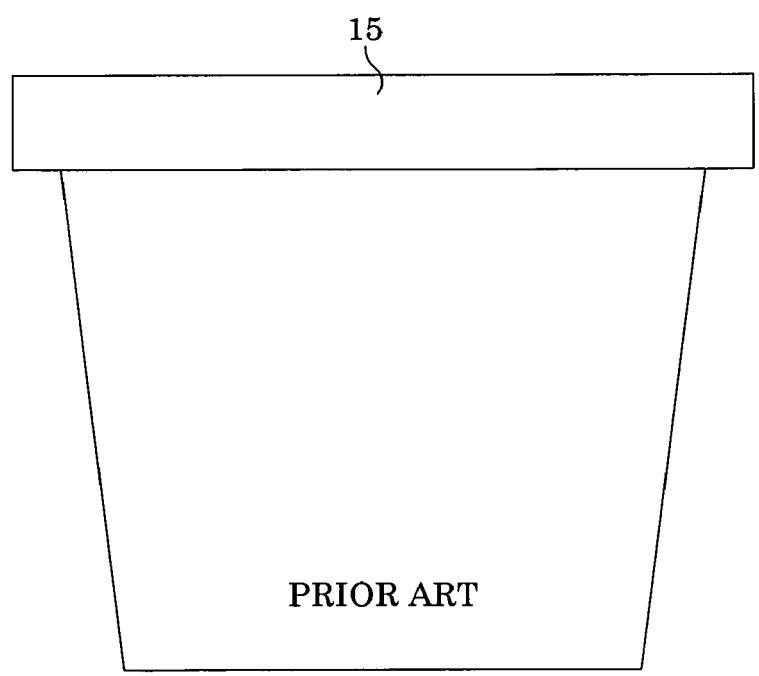
FIG. 14 is a front elevational view of a planter with which is used the apparatus of FIG. 13.

FIG. 12 shows a convention planter or planting pot 15 which has been fit with a removable solar cell apparatus 100. Pot 15 is shown alone in FIG. 14 and can be made from various materials now known or hereafter developed.

Figure 13:
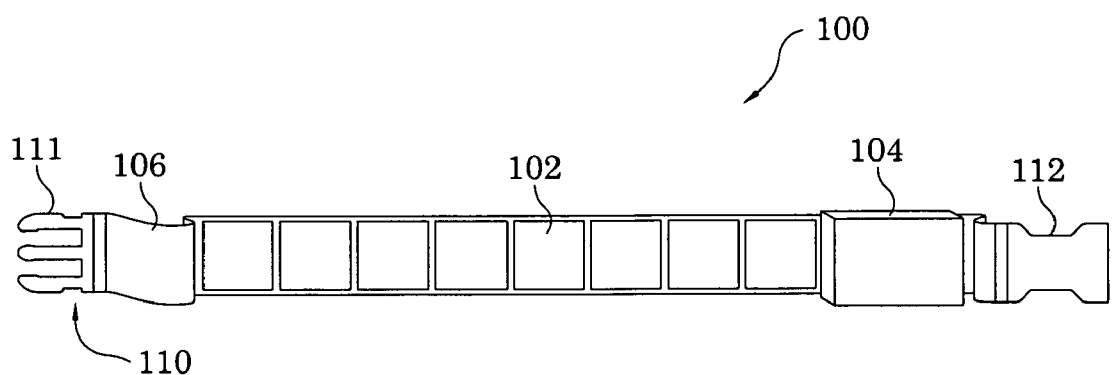
FIG. 13 is a partial plan view showing a further apparatus according to the invention.

FIG. 13 shows in isolation the removable solar cell apparatus 100. Apparatus 100 has a strap 106 which can advantageously be made of a resilient material to help provide circumferential forces that keep the apparatus in position upon pot 15 at a desired and suitable position, such as about the rim of the pot as shown in FIG. 12.

The apparatus has a desired array of solar cells 102 which are exposed at various locations upon the apparatus band 106. The preferred arrangement has solar cells 102 about most of the periphery of the pot 15 when installed and properly sized.

The band can be simply connected, such as using a safety pin or various connectors. One type of connector includes a clasp or connection 110 having a male part 111 and a receptacle or female part 112. Other types of connectors are possible. The band is simply installed upon the pot by extending the resilient band about the circumference and connecting the two ends. Alternatively, the band can be made in a loop which is elastic and merely slipped over the pot by expanding the elastic band and slipping it into position.

FIG. 13 shows that some or all of the power supply and electronics can be mounted upon the apparatus 100 in a module 104. In many instances the entire electronics and battery can be included in module 104 so that a small cable containing the wires needed to power operation of the pump and rotating assembly are trained up the plant supports, such as 14 in FIG. 1 and then to their respective components requiring wiring. This may also include the low water detector.

More About Methods Performed and Manners of Use

Methods Concerning Complete Plant Maintenance

Preferred methods according to the invention may include selecting an apparatus for suspending a planter. The apparatus has two assemblies that move in angular orientation change to present different sides of the plant to different orientations with associated varying incidence light.

The methods further include rotating or reorienting the planter through a range of different orientations. This reorienting is advantageously performed in a manner which includes rotational movement, more preferably continuously in the same direction, although reorienting by oscillatory or other forms of reorienting may also be possible.

Methods according to this invention may also advantageously include dispensing a desired liquid onto a planter held by the selected apparatus. The dispensing may be effected by transferring liquid from a reservoir on the apparatus to a discharge where the liquid is applied to a planter held by the apparatus either temporarily or more permanently.

The preferred methods for plant maintenance also preferably include generating electricity using solar energy. The generated electricity is made available to other electronics and the motors by storing the electricity. Storing of the solar based electrical energy is advantageously done using a battery. Alternatively, other storage devices may be suitable, such as capacitive storage or others.

Still further, some of the preferred methods include detecting liquid level in the liquid reservoir. This is preferably done using a low liquid level detector.

Methods Concerning Rotating and Dispensing Liquid to a Planter

In other aspects of the inventions described herein may include methods focused upon the on-board rotating and dispensing actions.

Preferred methods according to the invention may include selecting an apparatus for suspending a planter. The apparatus has two assemblies that move in angular orientation change to present different sides of the plant to different orientations with associated varying light incidence.

The methods further include rotating or reorienting the planter through a range of different orientations. This reorienting is advantageously performed in a manner which includes rotational movement, more preferably continuously in the same direction, although reorienting by oscillatory or other forms of reorienting may also be possible.

Methods according to this invention may also advantageously include dispensing a desired liquid onto a planter held by the selected apparatus. The dispensing may be effected by transferring liquid from a reservoir on the apparatus to a discharge where the liquid is applied to a planter held by the apparatus either temporarily or more permanently.

Methods Concerning Controlled Rotational Motion of a Planter

Additional aspects of methods according to the inventions may involve controlled rotational motion so that rotation is only performed with the frequency desired or necessary for the particular plant involved. Still further, the controlling of rotational motion may be accomplished so that rotational movement is performed by suspending operation thereof during periods of low ambient light.

Methods Concerning Deliver of Liquids to a Planter

Additional aspects of some preferred methods involve transferring liquid from the reservoir to a discharge and then discharging the liquid to the planter. The transferring preferably involves pumping liquid from the reservoir upwardly and then downwardly though a conduit that extends through a cavity formed in the apparatus.

The pumping and associated transferring and discharging are best done pumping from a pump mounted for rotational movement within the reservoir to keep power wires or other associated lines from twisting due to the rotational action of the rotating assembly relative to the stationary assembly.

Methods Concerning Stirring of Reservoir Contents

The pump or other features can further be used to perform a stirring step or steps of the liquid contained in the reservoir. This helps by inhibiting algae growth and other microbial growth.

The stirring also is an action which is useful to perform mixing of the liquid so that it is relatively homogeneous depending on any additives. This homogenizing of the liquid allows more uniform application of chemicals mixed or dissolved into the liquid.

Methods Concerning Driving the Rotating Assembly

Methods according to these inventions may further include driving the rotating assembly relative to the stationary assembly. This can advantageously be accomplished by rotating a drive motor. It may further involve engaging the rotating shaft or other part of the drive with the stationary assembly. In a preferred methods shown, the engaging involves meshing a pinion or other driving element with features on the stationary assembly or vice versa. The best current mode is by engaging a drive motor pinion with teeth formed on the opposing assembly and then rotating the motor and attached pinion.

Such methods are preferably in a continuous rotary motion but can also be done by oscillating the mechanical assemblies relative to one another.

Methods Concerning Involving Liquid Level Detection

Methods according hereto may further include detecting the level of liquid in the reservoir. This can be used by stopping the pumping of liquid. It may further include indicating when liquid level is low so that manual refilling of the reservoir can be performed.

Methods Concerning Solar Powering Configuration

One preferred method according to the inventions concerns selecting an apparatus having some or all the various features of the apparatus described herein. In particular, selecting an apparatus which has at least one solar electricity generator or solar cell or cells for generating electricity.

The preferred methods may also advantageously include storing electricity generated in an electricity storage device, such as the currently preferred nickel metal hydride battery or other batteries which perform well in repeated cycling of charging and discharging.

Further the methods may be defined to include exposing solar energy using an array of solar cells which are arranged about the apparatus rotating assembly so that incident light falling upon the solar cells is maintained almost equal through a wide or total range of rotation of the rotating assembly.

Methods Concerning Generating On-Board Electricity on a Planter

Methods according to the inventions may also be defined by generating electricity using solar cells which are mounted upon the planter. This may be accomplished using an array mounted to the planter, such as in FIG. 15 or by using an array connected using a detachable solar array.

Methods Concerning Fitting of Solar Array Upon Planter

The inventions may further involve fitting an array of solar panels onto a planter, such as by using the solar cell array band 100 of FIG. 13. This can be accomplished by positioning the band circumferentially about a planter and then connecting detachable ends.

Alternatively, the fitting may involve enlarging an elastic solar cell array band and positioning it in a looped or circuitous condition over the planter and adjusting the array band to a desired position.

Methods Concerning Manner of Use

The invention is used for hanging plants at a wide variety of positions. This is done by locating the desired position. The apparatus is then placed into use by hanging the apparatus 10 together with any planter. Alternatively, the apparatus may be hung and then installing the planter in planter supports connected to the rotating assembly so that the planter and any contained plant are reoriented sufficiently to provide even growth along all sides of the planter.

It is not necessary for the apparatus to be located immediately next to a well lit window, although the user may choose this as the desired position. Because of the circumferential solar cell array, light is transformed to electrical energy with little or no dependence on the rotational position of the rotating assembly.

More About Preferred Manners of Making the Preferred Inventions

The apparatus 10 can be made from various materials. A clear polymer material is desirable in some cases so that light passes therethrough to the plant and solar cells. Such a selection also allows the user to see easily within the apparatus to determine liquid level and the condition of the liquid, such as may require changing in certain circumstances.

One appropriate material is clear polyurethane which can be formed into the desired components of the apparatus. Excepted from such a material may be the material for pinion 64 which may be a metal or hard plastic of any of various types which will stand up to the rotating action and forces between the pinion and teeth that are developed during periods of rotation.

The planter may be made from traditional clay, plastic or many other materials in the desired shape, size and configuration.

The electronics are made from commercially available components and integrated circuits and discrete elements according to the particular design for the controller being employed.

Crystal clear rigid urethane casting compounds provide a strong clear apparatus. Such is considered adequately rigid and able to withstand the forces that will be present during use.

Interpretation Notes

The above description has set out various features, functions, methods and other aspects of the inventions. This has been done with regard to the currently preferred embodiments thereof. Time and further development may change the manner in which the various aspects are implemented. Such aspects may further be added to by the language of the claims which are incorporated by reference hereinto as originally filed.

The scope of protection accorded the inventions as defined by the claims is not intended to be necessarily limited to the specific sizes, shapes, features or other aspects of the currently preferred embodiments shown and described. The claimed inventions may be implemented or embodied in other forms while still being within the concepts shown, described and claimed herein. Also included are equivalents of the inventions which can be made without departing from the scope of concepts properly protected hereby.

I claim:

1. An apparatus for hanging, rotating, and supplying a liquid to a planter positioned in the apparatus, said planter being operable at various hanging locations without needing outside service connections, comprising:
  a stationary assembly for being hung in a desired hanging location for said apparatus;
  a rotating assembly rotatably connected to the stationary assembly for relative rotation with respect thereto, said rotating assembly being adapted to rotate a planter supported upon said apparatus;
  at least one reservoir on said apparatus for holding said liquid;
  at least one dispenser for dispensing liquid from said at least one reservoir to said planter when positioned in the apparatus;
  at least one liquid supply for controllably transferring liquid from said at least one reservoir to said at least one dispenser;
  at least one drive for controllably rotating the rotating assembly relative to the stationary assembly;
  at least one on-board power generator supported by said apparatus for supplying electrical power used to operate the apparatus;
  at least one controller for controlling rotation and dispensing of liquid by said at least one dispenser; and
  at least one planter support forming part of the rotating assembly for supporting said planter.

2. An apparatus according to claim 1 wherein said liquid supply comprises a pump, and a tube in fluid communication with said pump.

3. An apparatus according to claim 1 wherein said at least one onboard power supply comprises at least one solar cell which generates electricity.

4. An apparatus according to claim 1 wherein said at least one rotating assembly is driven by said at least one drive with a gear set between said stationary assembly and said rotating assembly.

5. An apparatus according to claim 1 wherein said at least one rotating assembly is driven by a drive with a motor on said rotating assembly.

6. An apparatus according to claim 1 wherein said at least one rotating assembly is driven by a drive with a motor on said stationary assembly.

7. An apparatus according to claim 1 wherein the rotating assembly has a top cover.

8. An apparatus according to claim 1 wherein the rotating assembly has a bearing mounted upon a tubular member centrally located within the stationary assembly and adjacent to the at least one reservoir.

9. An apparatus according to claim 1 wherein said at least one drive includes gear teeth along an upper rim of the stationary assembly.

10. An apparatus according to claim 1 wherein said at least one controller is affected by ambient light and operates the apparatus when ambient conditions are sufficiently light and renders it inoperative when ambient conditions are relatively dark.

11. An apparatus according to claim 1 and further comprising an ambient light sensor which supplies information to said at least one controller.

12. An apparatus for hanging, rotating, and supplying a liquid to a planter positioned in the apparatus, said planter being operable at various hanging locations without needing outside service connections, comprising:
  a stationary assembly for being hung in a desired hanging location for said apparatus;
  a rotating assembly rotatably connected to the stationary assembly for relative rotation with respect thereto, said rotating assembly being adapted to rotate a planter supported upon said apparatus;
  at least one reservoir on said apparatus for holding said liquid;
  at least one dispenser for dispensing liquid from said at least one reservoir to said planter when positioned in the apparatus;
  at least one liquid supply for controllably transferring liquid from said at least one reservoir to said at least one dispenser, said at least one liquid supply including wetted portions which are connected to the rotating assembly and extend into the reservoir and help stir and mix liquid contained therein;
  at least one drive for controllably rotating the rotating assembly relative to the stationary assembly;
  at least one on-board power generator supported by said apparatus for supplying electrical power used to operate the apparatus; and
  at least one controller for controlling rotation and dispensing of liquid by said at least one dispenser.

13. An apparatus for hanging, rotating, and supplying a liquid to a planter positioned in the apparatus, said planter being operable at various hanging locations without needing outside service connections, comprising:
  a stationary assembly for being hung in a desired hanging location for said apparatus;
  a rotating assembly rotatably connected to the stationary assembly for relative rotation with respect thereto, said rotating assembly being adapted to rotate a planter supported upon said apparatus, the rotating assembly having a top cover;
  at least one reservoir on said apparatus for holding said liquid;
  at least one dispenser for dispensing liquid from said at least one reservoir to said planter when positioned in the apparatus;
  at least one liquid supply for controllably transferring liquid from said at least one reservoir to said at least one dispenser;
  at least one drive for controllably rotating the rotating assembly relative to the stationary assembly, said top cover of the rotating assembly mounting at least one motor forming part of said at least one drive;
  at least one on-board power generator supported by said apparatus for supplying electrical power used to operate the apparatus; and
  at least one controller for controlling rotation and dispensing of liquid by said at least one dispenser.

14. An apparatus according to claim 13 and further comprising a motor mounted within the top cover.

15. An apparatus for hanging, rotating, and supplying a liquid to a planter positioned in the apparatus, said planter being operable at various hanging locations without needing outside service connections, comprising:
  a stationary assembly for being hung in a desired hanging location for said apparatus;
  a rotating assembly rotatably connected to the stationary assembly for relative rotation with respect thereto, said rotating assembly being adapted to rotate a planter supported upon said apparatus;

at least one reservoir on said apparatus for holding said liquid;
at least one dispenser for dispensing liquid from said at least one reservoir to said planter when positioned in the apparatus;
at least one liquid supply for controllably transferring liquid from said at least one reservoir to said at least one dispenser;
at least one drive for controllably rotating the rotating assembly relative to the stationary assembly, said at least one drive including gear teeth along a cover forming part of the rotating assembly;
at least one on-board power generator supported by said apparatus for supplying electrical power used to operate the apparatus; and
at least one controller for controlling rotation and dispensing of liquid by said at least one dispenser.

16. An apparatus for hanging, rotating, and supplying a liquid to a planter positioned in the apparatus, said planter being operable at various hanging locations without needing outside service connections, comprising:
a stationary assembly for being hung in a desired hanging location for said apparatus;
a rotating assembly rotatably connected to the stationary assembly for relative rotation with respect thereto, said rotating assembly being adapted to rotate a planter supported upon said apparatus;
a reservoir on said apparatus for holding said liquid;
a dispenser for dispensing liquid from said reservoir to said planter when positioned in the apparatus;
a liquid supply for controllably transferring liquid from said reservoir to said dispenser;
a drive for controllably rotating the rotating assembly relative to the stationary assembly;
an on-board power generator supported by said apparatus for supplying electrical power used to operate the apparatus;
a controller for controlling rotation and dispensing of liquid by said dispenser; and
a moisture sensor which, in operation, supplies information to said controller.

17. An apparatus according to claim 16 wherein said liquid supply comprises a one pump, and a tube in fluid communication with said pump.

18. An apparatus according to claim 16 wherein said onboard power supply comprises a solar cell.

19. An apparatus according to claim 16 wherein said rotating assembly is driven, in operation, by said drive with a gear set between said stationary assembly and said rotating assembly.

20. An apparatus according to claim 16 and further comprising a motor on said rotating assembly configured to drive said rotating assembly relative to said stationary assembly.

21. An apparatus according to claim 16 and further comprising a motor on said stationary assembly configured to drive said rotating assembly relative to said stationary assembly.

22. An apparatus according to claim 16 wherein the rotating assembly has a top cover.

23. An apparatus according to claim 22 and further comprising a motor mounted within the top cover.

24. An apparatus according to claim 23 wherein said at least one controller is affected by ambient light and causes the motor to operate when ambient conditions are sufficiently light.

25. An apparatus according to claim 16 wherein the rotating assembly has a tubular member centrally located within the stationary assembly and adjacent to the at least one reservoir, and the rotating member has a bearing mounted upon said tubular member.

26. An apparatus according to claim 16 wherein said at least one drive includes gear teeth along an upper rim of the stationary assembly.

27. An apparatus which is portable and is used for hanging, rotating and providing liquid to a plant, comprising:
a stationary assembly for being hung in a desired hanging location for said apparatus;
a rotating assembly rotatably connected to the stationary assembly for relative rotation with respect thereto;
a planter supported by said rotating assembly;
at least one planter support forming part of the rotating assembly for supporting said planter;
at least one reservoir on said apparatus for holding said liquid;
at least one dispenser for dispensing liquid from said at least one reservoir to said planter when positioned in the apparatus;
at least one liquid supply for controllably transferring liquid from said at least one reservoir to said at least one dispenser;
at least one drive for controllably rotating the rotating assembly relative to the stationary assembly;
at least one on-board power generator supported by said apparatus for supplying electrical power used to operate the apparatus; and
at least one controller for controlling rotation and dispensing of liquid by said at least one dispenser.

28. An apparatus according to claim 27 wherein said at least one liquid supply comprises a pump, and a tube in fluid communication with the pump.

29. An apparatus according to claim 27 wherein said at least one onboard power supply comprises at least one solar cell which generates electricity.

30. An apparatus according to claim 27 wherein said at least one rotating assembly is driven by said at least one drive with a gear set between said stationary assembly and said rotating assembly.

31. An apparatus according to claim 27 wherein said at least one rotating assembly is driven by a drive with a motor on said rotating assembly.

32. An apparatus according to claim 27 wherein said at least one rotating assembly is driven by a drive with a motor on said stationary assembly.

33. An apparatus according to claim 27 wherein the rotating assembly has a top cover.

34. An apparatus according to claim 27 wherein the rotating assembly has a top cover that mounts at least one motor forming part of said at least one drive with a motor mounted within the top cover.

35. An apparatus according to claim 27 wherein the rotating assembly has a bearing mounted upon a tubular member centrally located within the stationary assembly and adjacent to the at least one reservoir.

36. An apparatus according to claim 27 wherein said at least one drive includes gear teeth along an upper rim of the stationary assembly.

37. An apparatus according to claim 27 wherein said at least one controller is affected by ambient light and operates the apparatus when light and renders it inoperative when there is dark.

38. An apparatus according to claim 27 and further comprising an ambient light sensor which supplies information to said at least one controller.

39. An apparatus which is portable and is used for hanging, rotating and providing liquid to a plant, comprising:
- a stationary assembly for being hung in a desired hanging location for said apparatus;
- a rotating assembly rotatably connected to the stationary assembly for relative rotation with respect thereto;
- a planter supported by said rotating assembly;
- at least one reservoir on said apparatus for holding said liquid;
- at least one dispenser for dispensing liquid from said at least one reservoir to said planter when positioned in the apparatus;
- at least one liquid supply for controllably transferring liquid from said at least one reservoir to said at least one dispenser, said at least one liquid supply including wetted portions which extend into the reservoir and help circulate liquid contained therein;
- at least one drive for controllably rotating the rotating assembly relative to the stationary assembly;
- at least one on-board power generator supported by said apparatus for supplying electrical power used to operate the apparatus; and
- at least one controller for controlling rotation and dispensing of liquid by said at least one dispenser.

40. An apparatus which is portable and is used for hanging, rotating and providing liquid to a plant, comprising:
- a stationary assembly for being hung in a desired hanging location for said apparatus;
- a rotating assembly rotatably connected to the stationary assembly for relative rotation with respect thereto, the rotating assembly having a top cover;
- a planter supported by said rotating assembly;
- at least one reservoir on said apparatus for holding said liquid;
- at least one dispenser for dispensing liquid from said at least one reservoir to said planter when positioned in the apparatus;
- at least one liquid supply for controllably transferring liquid from said at least one reservoir to said at least one dispenser;
- at least one drive for controllably rotating the rotating assembly relative to the stationary assembly, said top cover of said rotating assembly mounting at least one motor forming part of said at least one drive;
- at least one on-board power generator supported by said apparatus for supplying electrical power used to operate the apparatus; and
- at least one controller for controlling rotation and dispensing of liquid by said at least one dispenser.

41. An apparatus which is portable and is used for hanging, rotating and providing liquid to a plant, comprising:
- a stationary assembly for being hung in a desired hanging location for said apparatus;
- a rotating assembly rotatably connected to the stationary assembly for relative rotation with respect thereto;
- a planter supported by said rotating assembly;
- at least one reservoir on said apparatus for holding said liquid;
- at least one dispenser for dispensing liquid from said at least one reservoir to said planter when positioned in the apparatus;
- at least one liquid supply for controllably transferring liquid from said at least one reservoir to said at least one dispenser;
- at least one drive for controllably rotating the rotating assembly relative to the stationary assembly, said at least one drive including gear teeth along a cover forming part of the rotating assembly;
- at least one on-board power generator supported by said apparatus for supplying electrical power used to operate the apparatus; and
- at least one controller for controlling rotation and dispensing of liquid by said at least one dispenser.

42. An apparatus which is portable and is used for hanging, rotating and providing liquid to a plant, comprising:
- a stationary assembly for being hung in a desired hanging location for said apparatus;
- a rotating assembly rotatably connected to the stationary assembly for relative rotation with respect thereto;
- a planter supported by said rotating assembly;
- at least one reservoir on said apparatus for holding said liquid;
- at least one dispenser for dispensing liquid from said at least one reservoir to said planter when positioned in the apparatus;
- at least one liquid supply for controllably transferring liquid from said at least one reservoir to said at least one dispenser;
- at least one drive for controllably rotating the rotating assembly relative to the stationary assembly;
- at least one on-board power generator supported by said apparatus for supplying electrical power used to operate the apparatus;
- at least one controller for controlling rotation and dispensing of liquid by said at least one dispenser; and
- a moisture sensor which, in operation, supplies information to said at least one controller.

* * * * *